United States Patent
Davis

(10) Patent No.: US 10,947,488 B2
(45) Date of Patent: *Mar. 16, 2021

(54) METHOD FOR RAPID MATURATION OF DISTILLED SPIRITS USING LIGHT AND HEAT PROCESSES

(71) Applicant: Lost Spirits Technology LLC, Los Angeles, CA (US)

(72) Inventor: Bryan Alexander Davis, Los Angeles, CA (US)

(73) Assignee: LOST SPIRITS TECHNOLOGY LLC, Los Angeles, CA (US)

(*) Notice: Subject to any disclaimer, the term of this patent is extended or adjusted under 35 U.S.C. 154(b) by 78 days.

This patent is subject to a terminal disclaimer.

(21) Appl. No.: 15/969,233

(22) Filed: May 2, 2018

(65) Prior Publication Data

US 2018/0346855 A1 Dec. 6, 2018

Related U.S. Application Data

(63) Continuation-in-part of application No. 15/583,993, filed on May 1, 2017, now Pat. No. 10,508,259, (Continued)

(51) Int. Cl.
*C12H 1/16* (2006.01)
*C12H 1/18* (2006.01)
(Continued)

(52) U.S. Cl.
CPC .............. *C12H 1/165* (2013.01); *C12G 3/07* (2019.02); *C12H 1/18* (2013.01); *C12H 1/22* (2013.01)

(58) Field of Classification Search
CPC . C12G 3/07; C12G 3/065; C12G 3/06; C12G 3/005; C12G 3/08; C12G 3/12;
(Continued)

(56) References Cited

U.S. PATENT DOCUMENTS 2,027,099 A 8/1933 Hochwalt
2,195,662 A 10/1935 Hays Van Sant
(Continued)

FOREIGN PATENT DOCUMENTS

DE 2829964 C2 7/1990
EP 0 768 373 A2 4/1997
(Continued)

OTHER PUBLICATIONS

International Search Report of PCT/US19/30399; dated Jul. 23, 2019.

*Primary Examiner* — Hong T Yoo
(74) *Attorney, Agent, or Firm* — Polsinelli PC

(57) ABSTRACT

An improved system and process for rapidly producing distilled spirits having characteristics associated with a much longer maturation process is provided. The method involves contacting wood with an amount of unmatured distilled spirit under heated conditions and contacting the resulting heat-treated spirit with actinic light. The disclosure provides embodiments where a spirit is sequentially processed through heat and actinic light treatment. The disclosure also provides embodiments where a heat-treated spirit is mixed with a spirit that has been separately treated with light to give characteristics of a mature spirit. Air may also be percolated through a mature spirit in a container with a headspace at a gauge pressure between about −25 inHg and about −30 inHg, until the alcohol concentration of the mature spirit is reduced by between about 1% to about 2% by volume, and until the total volume of the mature spirit is reduced by about 10% or less.

32 Claims, 8 Drawing Sheets

Related U.S. Application Data which is a continuation-in-part of application No. 14/795,841, filed on Jul. 9, 2015, now Pat. No. 9,637,713, which is a continuation-in-part of application No. 14/594,944, filed on Jan. 12, 2015, now Pat. No. 9,637,712, which is a continuation-in-part of application No. 14/152,915, filed on Jan. 10, 2014, now abandoned.

(51) Int. Cl.
  *C12G 3/07* (2006.01)
  *C12H 1/22* (2006.01)

(58) Field of Classification Search
  CPC . C12H 1/165; C12H 1/18; C12H 1/22; C12H 1/06; C12C 11/11
  See application file for complete search history.

(56) References Cited

U.S. PATENT DOCUMENTS

| | | | |
|---|---|---|---|
| 2,417,505 A | 3/1947 | Krebs et al. | |
| 2,653,092 A | 9/1953 | Renier | |
| 3,342,220 A | 9/1967 | Bartosek et al. | |
| 3,698,913 A | 10/1972 | Malinin | |
| 3,787,587 A | 1/1974 | Weber | |
| 5,102,675 A | 4/1992 | Howell et al. | |
| 5,903,060 A | 5/1999 | Norton | |
| 5,942,444 A | 8/1999 | Rittenburg et al. | |
| 6,001,410 A | 12/1999 | Bolen et al. | |
| 6,703,060 B1 | 3/2004 | Gross, II et al. | |
| 6,846,503 B2 | 1/2005 | Vickers, Jr. | |
| 6,869,630 B2 | 3/2005 | Gross, II et al. | |
| 7,063,867 B2 | 6/2006 | Tyler, III et al. | |
| 7,972,859 B2 | 7/2011 | Eastwood et al. | |
| 9,237,767 B2 | 1/2016 | Fiset | |
| 9,637,712 B2 * | 5/2017 | Davis | C12H 1/165 |
| 9,637,713 B2 * | 5/2017 | Davis | C12H 1/165 |
| 2001/0018086 A1 | 8/2001 | Gross et al. | |
| 2003/0035856 A1 | 2/2003 | Vickers, Sr. | |
| 2003/0110951 A1 | 6/2003 | Tyler, III et al. | |
| 2005/0123658 A1 | 6/2005 | Tyler, III et al. | |
| 2008/0091291 A1 | 4/2008 | Roy et al. | |
| 2009/0291175 A1 | 11/2009 | Wei et al. | |
| 2010/0018086 A1 | 1/2010 | Parienti | |
| 2010/0071259 A1 | 3/2010 | Hu et al. | |
| 2011/0070330 A1 | 3/2011 | Watson et al. | |
| 2011/0070331 A1 | 3/2011 | Watson et al. | |
| 2012/0058161 A1 | 3/2012 | Prestwich et al. | |
| 2012/0088018 A1 | 4/2012 | Lix | |
| 2012/0164300 A1 | 6/2012 | Niazi | |
| 2013/0149423 A1 | 6/2013 | Lix | |
| 2013/0228080 A1 | 9/2013 | Fiset | |
| 2017/0066740 A1 | 3/2017 | Liu et al. | |
| 2020/0123481 A1 * | 4/2020 | Davis | C12H 1/22 |

FOREIGN PATENT DOCUMENTS

| | | |
|---|---|---|
| FR | 1164437 | 10/1958 |
| FR | 1252201 | 12/1960 |
| RU | 2 451 722 C1 | 5/2012 |
| WO | 2017/066740 A1 | 4/2017 |

\* cited by examiner

US 10,947,488 B2

METHOD FOR RAPID MATURATION OF DISTILLED SPIRITS USING LIGHT AND HEAT PROCESSES

CROSS-REFERENCE TO RELATED APPLICATION

This application is a continuation-in-part of U.S. Ser. No. 15/583,993, filed May 1, 2017, now U.S. Pat. No. 10,508, 259; which is a continuation-in-part of U.S. Ser. No. 14/795, 841, filed Jul. 9, 2015, now U.S. Pat. No. 9,637,713, issued May 2, 2017; which is a continuation-in-part of U.S. Ser. No. 14/594,944, filed Jan. 12, 2015, now U.S. Pat. No. 9,637,712, issued May 2, 2017, which is a continuation-in-part of U.S. Ser. No. 14/152,915, filed Jan. 10, 2014, now abandoned, each of the disclosures of which are hereby incorporated by reference in their entirety.

TECHNICAL FIELD

The technical fields are: Food Chemistry and Other Consumer Goods.

BACKGROUND ART

By some accounts, human beings have been aging distilled spirits in wooden containers for almost five hundred years. Despite billions of person-hours of experience, the myriad of chemical reactions responsible for the flavor of wood-aged spirits are not fully understood. Spirits derive their distinct characteristics over time while stored in wooden containers in part by the production and presence of esters. Esters are compounds made by chemically bonding acid molecules and alcohol molecules to form new compounds, often with pleasant aromas and tastes. This process is known as "esterification." In addition to esterification, wood-aged spirits derive additional characteristics through other processes, including extraction of flavor compounds from the wood container (e.g., the ubiquitous oak barrel). These processes are not necessarily separate or distinct, and can interact with and affect each other.

Spirits also derive their distinct characteristics over time while stored in wooden containers in part from the quicker evaporation of more volatile organic compounds (VOCs) through the barrel walls, over the slower evaporation of other organic compounds. The aging process thus eliminates some undesired compounds, such as methanol, and concentrates and rebalances others, such as flavorful esters formed from reactions with the wood barrel.

Attempts have been made to accelerate maturation of distilled spirits by cycling or varying pressures over relatively large ranges (e.g., between −2 and 10 ATM; see U.S. Patent Publication No. 2013/0149423). These processes generally do not yield a product close enough to that produced by traditional means. Other environmental conditions are more important to achieve characteristics associated with a mature flavor.

Consumers of distilled spirits are often educated and discerning. Many will refuse to consume or pay a premium for non-authentic tasting products. What is needed is a means by which the quality and complexities associated with traditionally aged spirits can be achieved in a significantly reduced timeframe, sometimes with a reduction in the evaporation of finished goods and a reduction of the build-up of ethyl acetate.

SUMMARY

The following embodiments and aspects thereof are described and illustrated in conjunction with systems, tools, and methods which are meant to be exemplary and illustrative, not limiting in scope. In various embodiments, one or more of the above-described problems have been reduced or eliminated, while other embodiments are directed to other improvements.

One aspect of the present disclosure encompasses a process for producing a mature spirit. The process comprising (a) providing heat to a mixture consisting essentially of an unmatured distilled spirit and wood, to maintain a temperature of between about 140° F. and about 170° F. for about 12 hours to about 336 hours to give a distilled spirit mixture; (b) removing an amount of heat-treated distilled spirit mixture from step (a); (c) contacting the removed amount of heat-treated distilled spirit mixture with wood and actinic light at a wavelength ranging from 400 nm to 1000 nm for at least two hours to yield a heat-treated and actinic light-treated distilled spirit mixture; (d) transferring the heat-treated and actinic light-treated distilled spirit mixture or a portion thereof to the remaining heat-treated distilled spirit mixture from step (a) or a portion thereof to yield a combined mixture of heat-treated and actinic light-treated distilled spirit mixture; and (e) providing heat to the combined heat-treated and actinic light-treated distilled spirit mixture from step (d) or portion thereof to maintain a temperature of between about 140° F. and about 170° F. for about 12 hours to about 336 hours to produce the mature spirit.

Another aspect of the present disclosure encompasses a process for producing a mature spirit. The process comprising (a) providing heat to a mixture consisting essentially of an unmatured distilled spirit and wood, to maintain a temperature of between about 140° F. and about 170° F. for about 12 hours to about 336 hours to give a heat-treated distilled spirit mixture; (b) removing an amount of heat-treated distilled spirit mixture from step (a); (c) contacting the removed amount of heat-treated distilled spirit mixture with wood and actinic light at a wavelength ranging from 400 nm to 1000 nm for at least two hours to yield a heat-treated and actinic light-treated distilled spirit mixture; (d) transferring the heat-treated and actinic light-treated distilled spirit mixture or a portion thereof to the remaining heat-treated distilled spirit mixture from step (a) or a portion thereof to yield a combined mixture of heat-treated distilled spirit and heat-treated and actinic light-treated distilled spirit; (e) providing heat to the combined mixture of heat-treated distilled spirit and heat-treated and actinic light-treated distilled spirit from step (d) or portion thereof to maintain a temperature of between about 140° F. and about 170° F. for about 12 hours to about 336 hours to produce the mature spirit; and (f) percolating air through the mature spirit of step (e) in a container with a headspace at a gauge pressure between about −25 inHg and about −30 inHg until the alcohol concentration of the mature spirit is reduced by between about 1% and about 2% by volume and until the total volume of the mature spirit is reduced by about 10% or less.

An additional aspect of the present disclosure encompasses a process for producing a mature spirit. The process comprising (a) providing heat to a mixture consisting essentially of an unmatured distilled spirit and wood, to maintain a temperature of between about 140° F. and about 170° F. for about 12 hours to about 336 hours to give a heat-treated distilled spirit mixture; (b) removing an amount of heat-treated distilled spirit mixture from step (a); (c) contacting the removed amount of heat-treated distilled spirit mixture with wood and actinic light at a wavelength spectrum ranging from 400 nm to 1000 nm for at least two hours to yield a heat-treated and actinic light-treated distilled spirit mixture; (d) transferring the heat-treated and actinic light-treated distilled spirit mixture or a portion thereof with an amount of an unmatured distilled spirit to give a combined mixture of unmatured distilled spirit and heat-treated and actinic light-treated distilled spirit; and (e) providing heat to the combined mixture of unmatured distilled spirit and heat-treated and actinic light-treated distilled spirit from step (d) or portion thereof to maintain a temperature of between about 140° F. and about 170° F. for about 12 hours to about 336 hours to produce the mature spirit.

The unmature distilled spirit may be selected from the group consisting of sugar cane spirits, grain spirits, fruit spirits, and agave spirits. The unmature distilled spirit may also be selected from the group consisting of rum, tequila, mescal, whiskey, brandy, gin, and vodka.

The concentration in the mature spirit may be decreased for one or more chemical markers selected from the group consisting of methanol, $C_2$-$C_6$ fatty acids, and $C_2$-$C_6$ fatty acid esters, such as ethyl acetate. The concentration in the mature spirit may be increased for one or more chemical markers selected from the group consisting of vanillin, phenylated esters, $C_7$-$C_{24}$ fatty acid esters, and phenolic aldehydes. For example, the mature spirit may characterized by an increase in concentration of sinapaldehyde, ethyl dodecanoate, and ethyl decanoate, such as an increase in concentration of sinapaldehyde. In particular, the mature spirit may be characterized by amounts of sinapaldehyde, ethyl dodecanoate, and ethyl decanoate that are substantially similar to the relative proportions shown in FIG. 6, as measured by GCMS. The mature spirit may have an ethyl acetate concentration of about 59,000 µg/L.

Step (a) and step (e) are maintained at a temperature between about 140° F. and about 150° F. for a period of time ranging from about 168 hours to about 226 hours. Alternatively, step (a) and step (e) are maintained at a temperature between about 150° F. and about 160° F. for a period of time ranging from about 24 hours to about 72 hours. The process may further comprise (f) contacting the mature spirit of step (e) with wood and actinic light at a wavelength spectrum ranging from 400 nm to 1000 nm for at least two hours. The process may also further comprise (g) heating the mature spirit of step (f) with wood at a temperature between about 140° F. and about 170° F. for a period of time ranging from about 24 hours to about 336 hours.

An additional aspect of the present disclosure encompasses a process for producing a mature spirit. The process comprising (a) contacting a mixture consisting essentially of a first unmatured distilled spirit with wood and actinic light at a wavelength spectrum ranging from 400 nm to 1000 nm for at least two hours to yield a actinic light-treated distilled spirit mixture; (b) transferring the actinic light-treated distilled spirit mixture or a portion thereof to a second unmatured distilled spirit or a portion thereof to yield a combined mixture of heat-treated distilled spirit and unmatured distilled spirit; and (c) providing heat to the combined mixture of heat-treated distilled spirit and second unmatured distilled spirit from step (b) or portion thereof to maintain a temperature of between about 140° F. and about 170° F. for about 12 hours to about 336 hours to produce the mature spirit.

Yet another aspect of the present disclosure encompasses a process for producing a mature spirit. The process comprising (a) contacting a first mixture consisting essentially of an unmatured distilled spirit with wood and actinic light at a wavelength spectrum ranging from 400 nm to 1000 nm for at least two hours to yield an actinic light-treated distilled spirit mixture; (b) providing heat to a second mixture consisting essentially of an unmatured distilled spirit and wood to maintain a temperature of between about 140° F. and about 170° F. for about 12 hours to about 336 hours to yield a heat-treated distilled spirit mixture; (c) combining the actinic light-treated distilled spirit mixture or a portion thereof and the heat-treated distilled spirit mixture or a portion thereof to yield a combined mixture of an actinic light-treated distilled spirit and heat-treated distilled spirit; and (d) providing heat to the actinic light-treated distilled spirit and heat-treated distilled spirit of step (c) or portion thereof to maintain a temperature of between about 140° F. and about 170° F. for about 12 hours to about 336 hours to yield a mature spirit.

Additional embodiments and features are set forth in part in the description that follows, and will become apparent to those skilled in the art upon examination of the specification, or may be learned by the practice of the embodiments discussed herein. A further understanding of the nature and advantages of certain embodiments may be realized by reference to the remaining portions of the specification and the drawings, which forms a part of this disclosure.

BRIEF DESCRIPTION OF THE DRAWINGS

The disclosure will be readily understood by the following detailed description in conjunction with the accompanying drawings, wherein like reference numerals designate like structural elements. The drawings provide exemplary embodiments or aspects of the disclosure and do not limit the scope of the disclosure.

DETAILED DESCRIPTION

Figure 1:
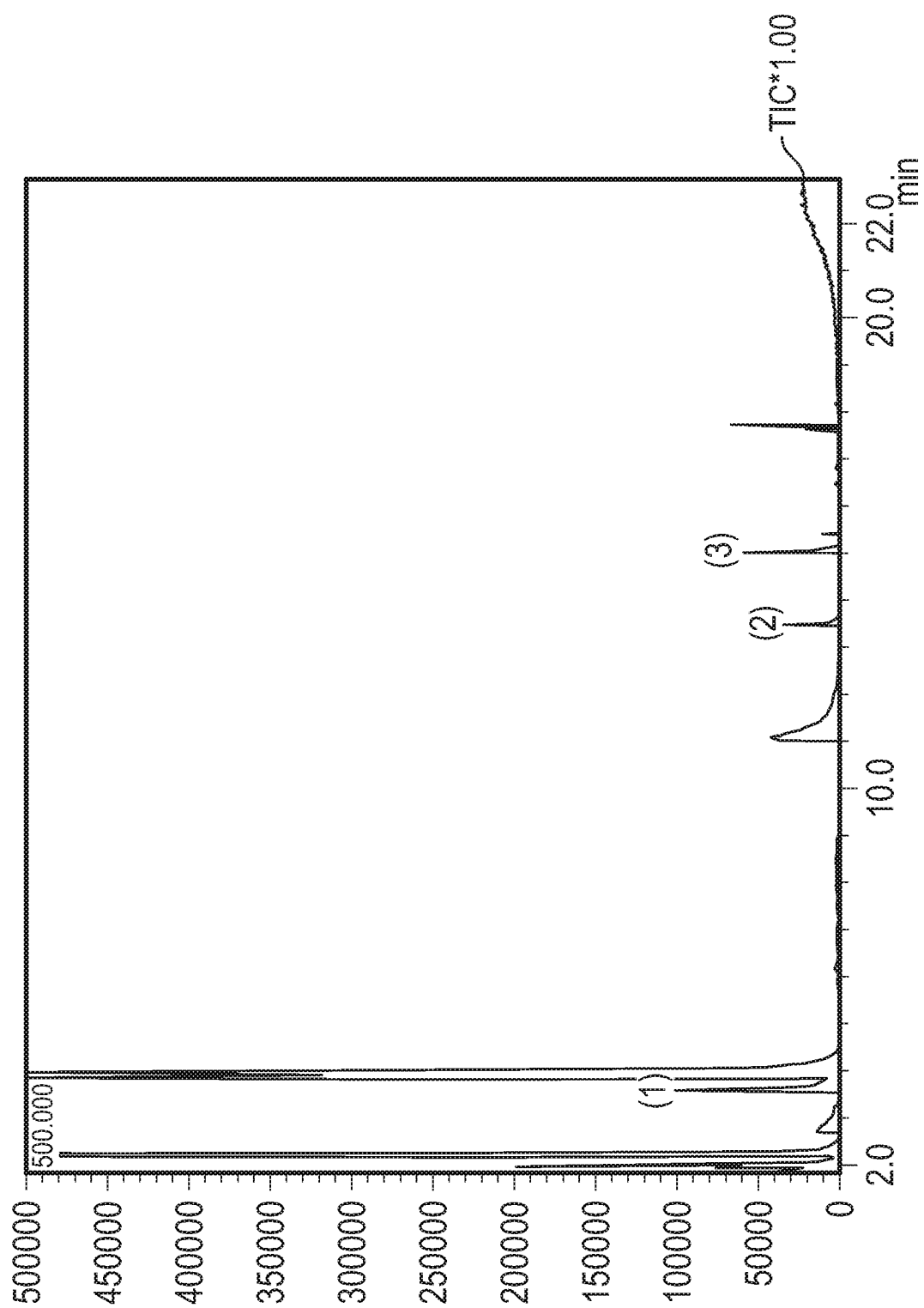
FIG. 1 shows the gas chromatograph mass spectrometry (GCMS) chromatogram from an unprocessed rum sample.

The disclosure pertains to processes for producing a distilled spirit having characteristics associated with a mature distilled spirit. The distilled spirit produced in accordance with the process has many of the characteristics associated with a matured distilled spirit produced in accordance with industry standards, but is advantageously produced in a shortened timeframe while eliminating the evaporation problem and greatly reducing the "off flavors" associated with excess ethyl acetate. By contacting an unmatured distilled spirit with wood at increased temperatures and contacting the spirit with actinic light, the maturation process can be shortened without reducing the quality of the spirit. In particular, it has surprisingly been found that the processes described herein produce a spirit having similar chemical markers as a 33-year-old spirit in a significantly reduced period of time.

This disclosure pertains also to processes for producing a distilled spirit having characteristics associated with a mature distilled spirit. The distilled spirit produced in accordance with the process has many of the characteristics associated with a matured distilled spirit produced in accordance with industry standards, but is advantageously produced in a shortened timeframe while reducing the evaporation problem and greatly reducing the "off flavors" associated with excess volatile organic compounds (VOCs), such as methanol and ethyl acetate. By percolating air through a distilled spirit in a container with a headspace at a gauge pressure between about −25 inHg and about −30 inHg until the alcohol concentration of the distilled spirit is reduced by between about 1% and about 2% by volume, and until the total volume of the distilled spirit is reduced by about 10% or less, the concentration of unwanted chemical markers is decreased and the concentration of desired chemical markers is increased, without the drastic volume losses associated with traditional aging.

The distilled spirit in step (a) may begin with an alcohol concentration greater than 60% by volume, and the process may then further comprise (b) diluting the distilled spirit of step (a) with water to an alcohol concentration between about 50% and about 55% by volume, and then (c) percolating air through the diluted distilled spirit in the container with the headspace at a gauge pressure between about −25 inHg and about −30 inHg until the alcohol concentration of the diluted distilled spirit is reduced by an additional amount of between about 0.3% and about 1% by volume.

Additional embodiments and features are set forth in part in the description that follows, and in part will become apparent to those skilled in the art upon examination of the specification, or may be learned by the practice of the embodiments discussed herein. A further understanding of the nature and advantages of certain embodiments may be realized by reference to the remaining portions of the specification, the drawings, and descriptions, which forms a part of this disclosure.

As used herein, a spirit refers to any distilled spirit. In particular embodiments, the spirit may be a sugar cane-based, grain-based, fruit-based, or agave-based spirit, such as rum, tequila, mescal, whiskey, brandy, gin, vodka, or combinations thereof. The distilled spirit may be a sugar cane-based spirit, such as rum. The distilled spirit may be a grain-based spirit, such as whiskey, bourbon, or scotch. The distilled spirit may be a fruit-based, such as brandy. The distilled spirit may be an agave-based spirit, such as tequila or mescal. The distilled spirit may be rum. The distilled spirit may be tequila. The distilled spirit may be mescal. The distilled spirit may be whiskey. The distilled spirit may be brandy. The distilled spirit may be gin. The distilled spirit may be vodka.

The spirit may be newly distilled or it may have already undergone a standard or accelerated aging process. For example, a 15-year whiskey may be treated as disclosed herein to produce a whiskey having a 20-year or 30-year chemical profile. In other words, when a process disclosed herein is applied to aged spirits, the ratios of chemical markers are altered and make the distilled spirit appear much older than it is. The process works on any spirit, including un-aged spirits such as vodka, gin, un-aged rum, un-aged tequila, un-aged brandy (eau de vie), and the like. Here, the process removes the sensation alcohol burn and trace methanol.

A distilled spirit having the characteristics associated with a matured distilled spirit, as used herein, describes a spirit, which, by one or more chemical markers, has attained characteristics associated with spirits aged in accordance with industry standards. Such standards, for example, include aging a spirit in wood over a period of time greater than 1, 5, 10, 15, 20, 25, or 30 years. The characteristics associated with a matured distilled spirit may include taste, aroma, and body profiles, such as smoothness.

As used herein, lux hours refers to the amount of light exposure in a given hour. Specifically, cumulative lux hours can be defined as how much energy from light should be provided over a specified period of time.

The disclosed process rapidly removes undesired chemical markers and concentrates desired chemical markers. A mature distilled spirit having the characteristics associated with a matured distilled spirit, as used herein, describes a spirit, which has attained a flavor and aroma profile organoleptically similar to spirits aged with wood for many years, and typically showing a chemical profile containing key chemical markers in particular proportions.

Traditionally, producing wood-aged distilled spirits has included carboxylic acid esterification, phenolic acid esterification, and the formation of complex esters, including both phenolic and carboxylic acids. Carboxylic acid esters are responsible for the fruity aromas and tastes in distilled spirits. Carboxylic precursor acids are derived from the yeast and bacteria during fermentation. If organic materials are used for the container in which these reactions occur, those materials also influence the process. For example, where a charred or toasted oak barrel is used, carboxylic precursor acids are also derived from thermal decomposition of the oak polymer, hemi-cellulose, found in the inner lining of the barrel.

Off-flavors are various flavorful or aromatic compounds present in spirits that are often described by connoisseurs using colorful terms (e.g., "sulfury," "solventy," "meaty," "acidic," "metallic," "vegetal," etc.). Carboxylic precursor acids are largely responsible for "off-flavors" in distilled spirits. Another common flaw with a solvent-like "off flavor" is produced by build-up of ethyl acetate in the maturing spirit. Other compounds, such as methanol, may not impact flavor but do diminish the consumers' enjoyment of the distilled spirit.

The disclosed process favors the removal of methanol above other compounds present in distilled spirits. Previously known methods were very costly to remove methanol from distilled spirits. Methanol is partly responsible for hangovers and its removal is critical for consumer quality perceptions. Without wishing to be bound by theory, methanol is removed from the distilled spirit as its azeotrope or eutectic. When a second sequential negative pressure treatment is used, the distilled spirits are diluted with water to bottling strength, thereby changing the azeotropic distribution within the spirits. The method may also remove the perception of heat in all types of spirits. This is something consumers use to perceive quality in distilled spirits.

Historically, ethyl acetate concentration was used as a marker for the progress of aging where higher amounts indicate greater maturation time. But, ethyl acetate is not itself desirable and adds a flavor and aroma comparable to paint thinners. Moreover, samples of distilled spirits receiving high reviews, comparable or in some cases better than an aged spirit, do not always have a high ethyl acetate concentration. Using modern techniques, highly prized spirits can be analyzed for their chemical make-up. Using these data, chemical markers can be selected as a model for a mature spirit. Surprisingly, these chemical markers provide advantages over the traditional measurement of ethyl acetate concentration to determine age. In particular, the chemical markers set forth herein are desirable for modeling purposes because, unlike ethyl acetate, the chemical markers contribute to the desired flavor profile. In one embodiment, ethyl acetate concentrations are reduced to a concentration less than about 200,000 μg/L. In another embodiment, the ethyl acetate concentrations range between about 50,000 μg/L and about 170,000 μg/L.

Fatty acids are structurally simple and even with their derivatives can be subdivided into well-defined families. Among straight-chain fatty acids, the simplest are referred to as saturated fatty acids. They have no unsaturated linkages in the carbon backbone and cannot be altered during hydrogenation or halogenation process. Saturated fatty acids tend to be solid at room temperature and their melting points increase with increasing chain length.

The fatty acid chain lengths may range between 2 and 80 carbon atoms, and commonly between 12 and 24 carbons. With a chain length between 2 and 6 carbon atoms, the fatty acids are called short-chain fatty acids, or $C_2$-$C_6$ acids. Examples of suitable short-chain fatty acids include, but not limited to, formic acid, acetic acid, proprionic acid, butyric acid, isobutyric acid, valeric acid, and isovaleric acid. $C_2$-$C_6$ fatty acid esters include the $C_2$ fatty acid ester ethyl acetate.

With a chain length from 6 to 12 carbon atoms, the fatty acids are called medium-chain fatty acids, or $C_6$-$C_{12}$ fatty acids. A common subgroup of medium-chain fatty acids is $C_8$-$C_{10}$ fatty acids, having 8 to 10 carbon atoms in the chain. Examples of suitable medium-chain fatty acids include, but are not limited to, caproic acid ($C_6$), enanthic acid ($C_7$), caprylic acid (CO, pelargonic acid ($C_9$), capric acid ($C_{10}$), undecylic acid ($C_{11}$), and lauric acid ($C_{12}$).

With a chain length between 12 and 24, the fatty acids are called a long-chain fatty acids, or $C_{12}$-$C_{24}$ fatty acids. The same chain length ranges apply to fatty acid derivatives, such as fatty acid esters. Examples of suitable long-chain fatty acids include, but are not limited to, tridecylic acid ($C_{13}$), myristic acid ($C_{14}$), pentadecanoic acid ($C_{15}$), palmitic acid ($C_{16}$), margaric acid ($C_{17}$), stearic acid ($C_{18}$), nonadecylic acid ($C_{19}$), arachidic acid ($C_{20}$), and heneicosylic acid ($C_{21}$).

The fatty acids may be unsaturated, such as an ω-3 unsaturated fatty acid, for example, α-linolenic acid (18:3), stearidonic acid (18:4), eicosapentaenoic acid (20:5), and docosahexaenoic acid (22:6); an ω-6 unsaturated fatty acid, for example, linoleic acid (18:2), γ-linolenic acid (18:3), dihomo-γ-linolenic acid (20:3), arachidonic acid (20:4), and adrenic acid (22:4); an ω-7 unsaturated fatty acid, for example, palmitoleic acid (16:1), vaccenic acid (18:1), and paullinic acid (20:1); or an ω-9 unsaturated fatty acid, for example, oleic acid (18:1), elaidic acid (trans-18:1), gondoic acid (20:1), erucic acid (22:1), nervonic acid (24:1), and mead acid (20:3).

Fischer esterification of fatty acids and alcohol is a well-understood and commonly practiced chemical reaction. A typical laboratory process involves heating a solution of fatty acids and alcohols under reflux in the presence of an acid catalyst. In laboratory settings, strong acids (e.g., sulfuric acid) are typically employed as the catalyst, but this can be incompatible with spirit making where other functional groups are sensitive to stronger acids and where chemical additives are typically prohibited. It has long been known that Fischer esterification can also be completed using weak acid catalysts, but at the expense of relatively slow reaction rates. Where charred or toasted oak barrels are used during the maturation of distilled spirits, weak acids may be gradually extracted from organic material in the walls of the barrel. It typically takes years for esters to accumulate using weak acid catalysts derived from the barrel, although it has been observed that in warmer environments (i.e., modestly heated within the range of normal atmospheric conditions less than 120° F.) the process can be accelerated significantly (from decades to years). This early form of accelerated aging comes at the cost of increased evaporation from the barrel. Often as much as 50% of the product can be lost to evaporation.

When the alcohol component is glycerol, the fatty acid esters produced can be monoglycerides, diglycerides, or triglycerides. Dietary fats are chemically triglycerides. Suitable examples of fatty acid esters include, but are not limited to, 2-arachidonoylglycerol, ascorbyl palmitate, ascorbyl stearate, cetyl myristoleate, cetyl palmitate, ethyl decadienoate, ethyl decanoate, ethyl eicosapentaenoic acid, ethyl macadamiate, ethyl octanoate, ethyl palmitate, ethylhexyl palmitate, glycerol monostearate, glyceryl hydroxystearate, glycol distearate, glycol stearate, isopropyl palmitate, monoctanoin, monolaurin, 2-oleoylglycerol, polyglycerol polyricinoleate, and virodhamine.

Phenolic aldehydes also play a major role producing aromas similar to vanilla, pipe tobacco, and smoke. Phenolic aldehydes are largely derived from thermally broken down oak polymers found within the inner lining of the barrel. Complex esters are responsible for complex honeyed aromas in distilled spirits. The complex esters are generally produced from the chemical reactions of both carboxylic and phenolic acids/aldehydes with alcohols during the time in the barrel or other container. Phenolic aldehydes are derivatives of phenol. Suitable examples of phenolic aldehydes include, but are not limited to, hydroxybenzaldehydes, protocatechuic aldehyde, vanillin, isovanillin, 2,3,4-trihydroxy benzaldehyde, sinapaldehyde (3-(4-hydroxy-3,5-dimethoxyphenyl)prop-2-enal), and syringaldehyde (4-hydroxy-3,5-di methoxybenzaldehyde).

Wood extraction is the process that gives distilled spirits their color and astringent "oaky" and "smoky" taste. Traditionally, this is attributed to tannins (polyphenols). Interestingly, our analysis of mature spirits did not find significant evidence of tannins. But instead found myriad less complex wood derived phenols such as sinapaldehyde and syringaldehyde. These oak-extracted compounds proved unexpectedly useful as markers for monitoring the aging process described below.

Esterification and the extraction of wood compounds from the wood container are some of the primary reactions taking place in the maturation process of distilled spirits. Because these processes run concurrently, and often interact with or depend on each other as well as the material and other conditions of their environment over time, it is very difficult to deviate very far from traditional methods while still achieving similar results. For example, rapid oak extraction may not provide enough time for interaction with a wood container to pick up some of the more subtle and complex flavors present in traditionally aged spirits. Much of the expense in spirit making stems from the long latency in creating the end product as well as the product evaporation from the barrel. Stock must be stored, often in climate-controlled environments, and tested repeatedly during maturation. But, it is difficult to predict markets many years out. Makers that produce too much product fail to maximize their investment, whereas those that produce too little fail to capture potentially significant portions of the upside.

In one embodiment, a mature spirit can be characterized by the decreasing concentrations of one or more chemical markers. Through operation of a process disclosed herein, the concentration in the distilled spirit may decrease for one or more chemical markers selected from the group consisting of methanol, $C_2$-$C_6$ fatty acids, and $C_2$-$C_6$ fatty acid esters.

The concentration in the distilled spirit may increase for one or more chemical markers selected from the group consisting of vanillin, phenylated esters, $C_7$-$C_{24}$ fatty acid esters, and phenolic aldehydes. These things are responsible for the flavor described as the "finish" in distilled spirits. Three markers in particular, are thought to be particularly useful for defining a mature spirit: sinapaldehyde, ethyl decanoate, and ethyl dodecanoate. Ethyl decanoate and ethyl dodecanoate are often found in unmature spirits at low concentrations. Sinapaldehyde is typically not found in an unmature spirit.

The distilled spirit may be characterized by an increase in concentration of sinapaldehyde, ethyl dodecanoate, and ethyl decanoate. The distilled spirit may be characterized by an increase in concentration of sinapaldehyde. In one embodiment, a mature spirit may be characterized by an increase of at least about threefold for ethyl dodecanoate over an unmature spirit. In another embodiment, a mature spirit is characterized by an increase of at least about threefold for ethyl decanoate over an unmature spirit. Increased concentrations may be assessed by any method known in the art.

A spirit that presents these three compounds in relative proportion (as assessed by peak height measured by gas chromatography mass spectrometry (GCMS)) typically has desirable flavor characteristics. In this regard, a mature spirit may also be characterized by a sinapaldehyde peak greater than 80% and less than 200% of the peak height of ethyl decanoate and ethyl dodecanoate as measured by GCMS. Without being bound to any theory, it is believed that sinapaldehyde concentration is disproportionately important in creating a spirit that meets the organoleptic properties of a mature spirit.

Figure 5:
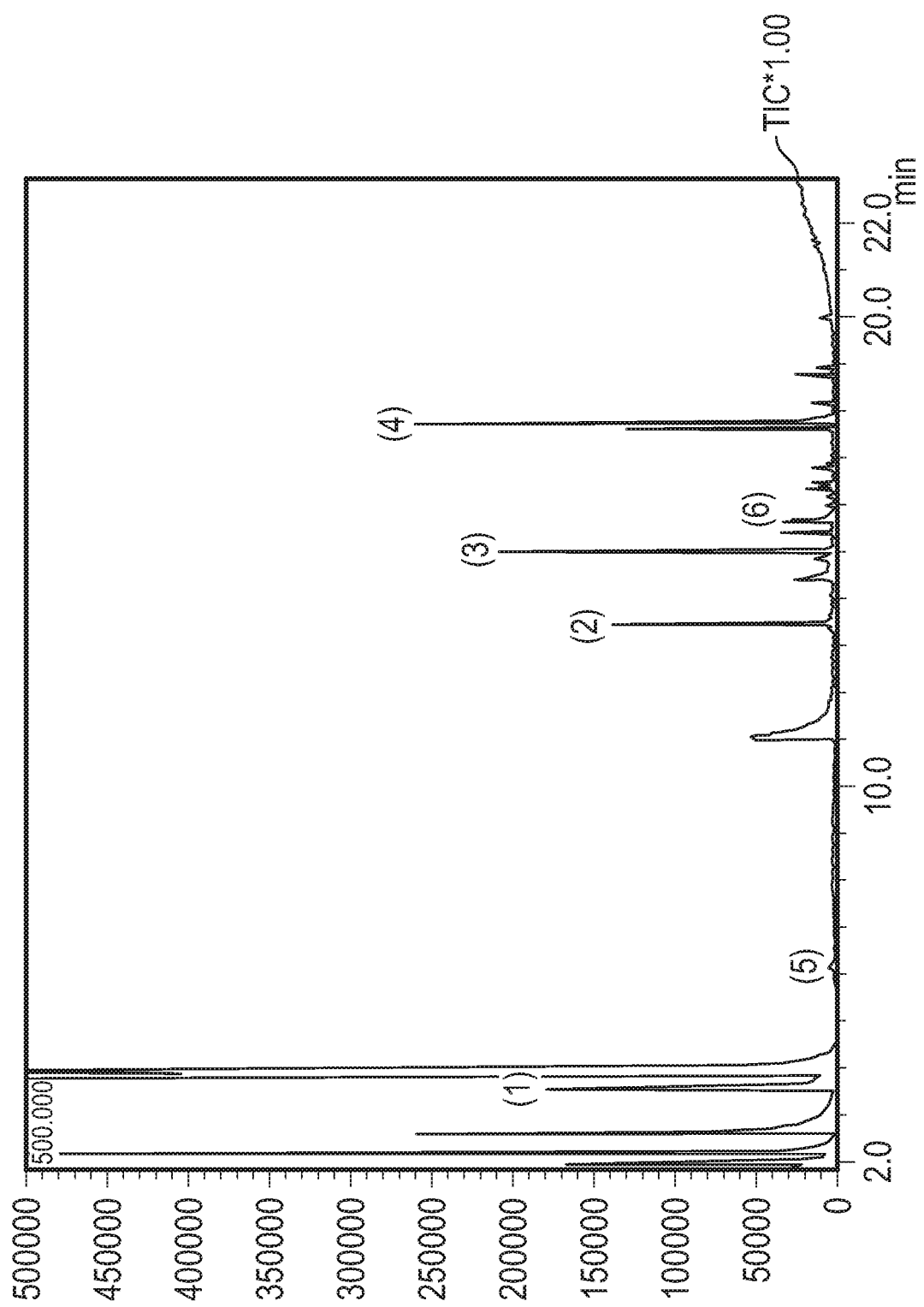
FIG. 5 shows the GCMS chromatogram from a rum sample that is a mixture of rum subjected to heat and rum subjected to actinic light in accordance with Example 5.

In another embodiment, a mature spirit is one that produces relative peak heights that are substantially similar to the peak heights shown in FIG. 5 for sinapaldehyde, ethyl decanoate, and ethyl dodecanoate. "Substantially similar," as used herein, refers to a relative peak height differing by no more than 30%, no more than 25%, no more than 20%, no more than 15%, no more than 10%, no more than 5%, or no more than 2%. In still another embodiment, a mature spirit is one that produces relative peak heights that are substantially similar to the relative peak heights shown in FIG. 5 for sinapaldehyde, ethyl decanoate, ethyl dodecanoate, and acetal. In still a further embodiment, a mature spirit is one that produces relative peak heights that are substantially similar to the relative peak heights shown in FIG. 5 for sinapaldehyde, ethyl decanoate, ethyl dodecanoate, acetyl, and syringaldehyde.

Figure 6:
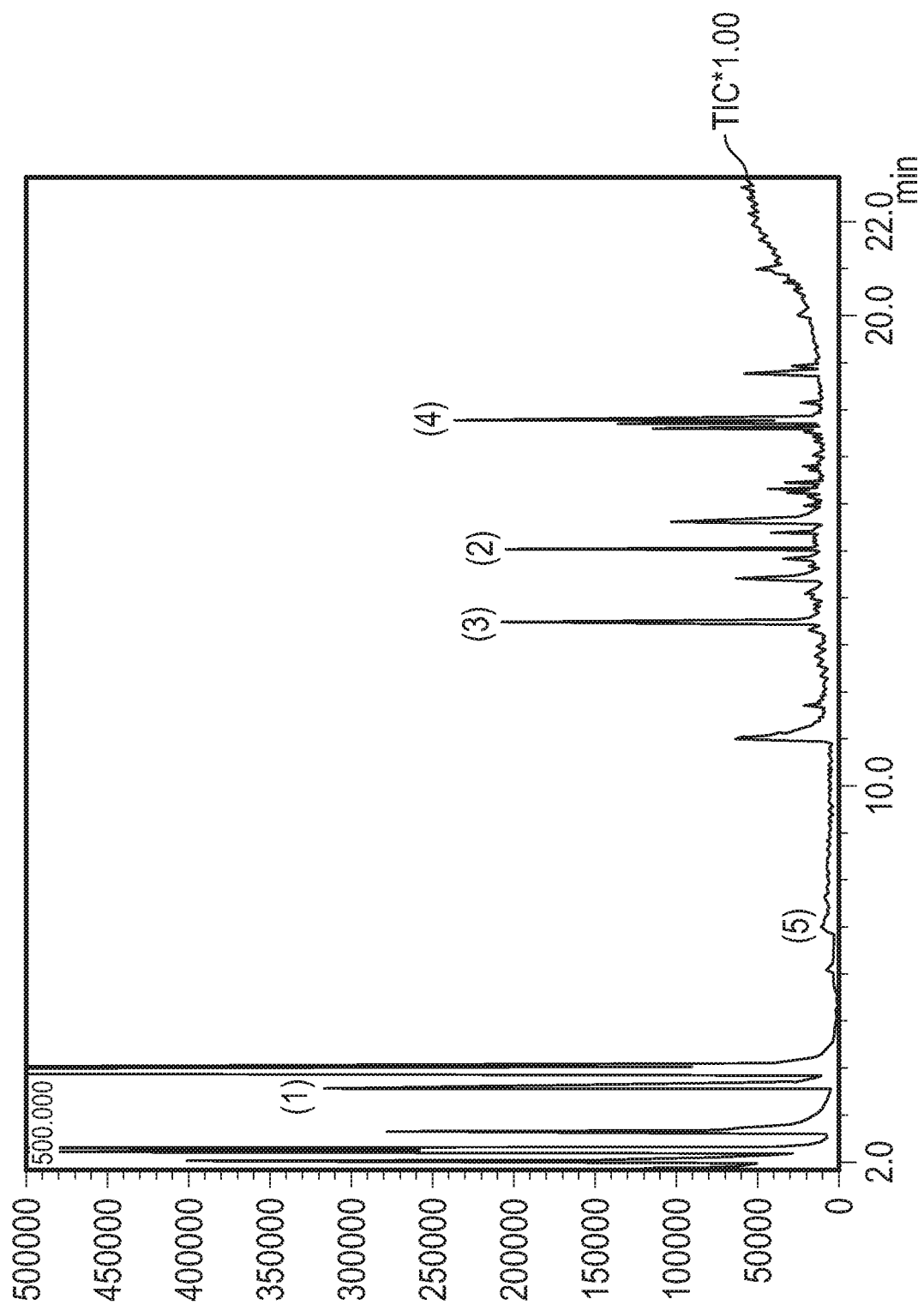
FIG. 6 shows the GCMS chromatogram from a rum sample that has been processed with both heat and light in accordance with Example 6.

In yet another embodiment, a mature spirit is one that produces relative peak heights that are substantially similar to the relative peak heights shown in FIG. 6 for sinapaldehyde, ethyl decanoate, and ethyl dodecanoate. In still another embodiment, a mature spirit is one that produces relative peak heights that are substantially similar to the relative peak heights shown in FIG. 6 for sinapaldehyde, ethyl decanoate, ethyl dodecanoate, and acetal (1,1-diethoxyethane). In yet another embodiment, a mature spirit is one that produces relative peak heights that are substantially similar to the relative peak heights shown in FIG. 6 for sinapaldehyde, ethyl decanoate, ethyl dodecanoate, acetal, and syringaldehyde.

The unmatured distilled spirit is a spirit that has not attained the markers or characteristics associated with a matured distilled spirit. The "unmatured distilled spirit," as described herein, refers to white or raw spirits, as well as partially matured spirits, provided that the unmatured distilled spirit is lacking in certain characteristics of a matured spirit. The unmatured distilled spirit, as described herein, has an alcohol content of at least 50% by volume. In some embodiments, the alcohol content of the unmature distilled spirit is between 50% and 80% by volume.

The term "distilled spirit mixture," as used herein, refers to any distillate on the spectrum from matured to unmatured. The term "distillate" as used herein refers to the liquid composition in the vessel and may include an unmatured distilled spirit, a matured distilled spirit, or a distilled spirit mixture.

The unmatured distilled spirit is contacted with wood in a vessel. In one embodiment, the wood is provided as the vessel for holding the distillate. In such embodiments, the vessel is, for example, an oak barrel. In other embodiments, wood may be provided to the inside of the reaction vessel, which is optionally made of wood. Non-limiting examples of wood may be wood strips, wood chips, wood pellets, wood planks, wood powder, wood pulp, and the like. For example, wood chips or wood pellets may be added such that they are submerged or floating on top of the distillate. Wood may also be provided as various structural configurations within the vessel including as baffles or packing. In still other embodiments, wood may include wood extracts and raw acids designed to mimic the characteristics of wood. In one embodiment, the wood is oak.

Of the various advantages of the present disclosure, one is that no additional ingredients or acids are provided to facilitate the process. In this regard, the process is free of additives. Without being bound to any particular theory, it is thought that the inventive process rapidly extracts acids from the wood. These acids facilitate the esterification process without the need for additives beyond the wood and the unmatured distilled spirit.

A. Sequential Temperature and Light Processing

One aspect of the present disclosure provides a process for producing a mature spirit using sequential temperature and light processing. In this regard, the process comprises the steps of (a) providing heat to a mixture consisting essentially of an unmatured distilled spirit and wood, to maintain a temperature of between about 140° F. and about 170° F. for about 24 hours to about 336 hours to give a distilled spirit mixture; (b) removing an amount of the distilled spirit mixture from step (a); (c) contacting the amount of the distilled spirit mixture with wood and actinic light at a wavelength spectrum ranging from 400 nm to 1000 nm for at least two hours to give an actinic light-treated distilled spirit mixture; (d) transferring the actinic light-treated distilled spirit mixture to the remaining distilled spirit mixture from step (b) to give a distilled spirit and actinic light-treated distilled spirit mixture; and (e) providing heat to the distilled spirit and actinic light-treated distilled spirit mixture to maintain a temperature of between about 140° F. and about 170° F. for about 12 hours to about 336 hours to produce the mature spirit.

(i) First Thermal Process

In the sequential process described herein, the unmatured spirit is be subjected to thermal processing. In this regard, the unmatured distilled spirit is contacted with the wood at a temperature ranging from about 140° F. to about 170° F. In alternate embodiments, the temperature ranges from about 140° F. to about 150° F., from about 145° F. to about 150° F., from about 150° F. to about 160° F., from about 160° F. to about 165° F., or from about 165° F. to about 170° F. In other embodiments, the temperature may be about 140° F., about 145° F., about 150° F., about 155° F., about 160° F., about 165° F., or about 170° F.

Figure 3:
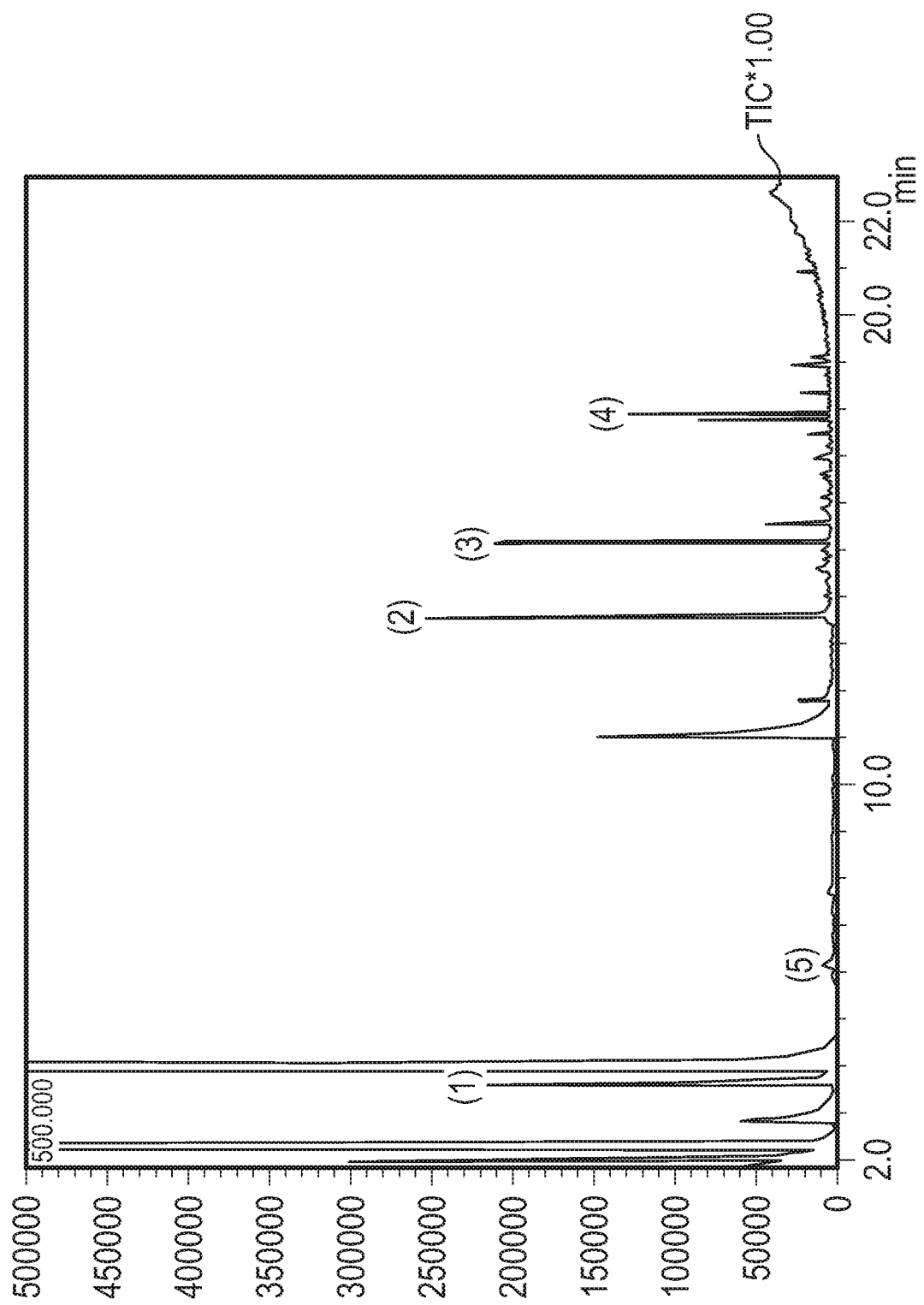
FIG. 3 shows the GCMS chromatogram from a rum sample that was subjected to heating in accordance with Example 3 but was not subjected to actinic light.

The time period needed to convert the unmatured distilled spirit to a distilled spirit mixture having partial characteristics associated with a matured spirit, for example, as shown in FIG. 3, depends on factors such as the starting composition of the unmatured distilled spirit and the temperature at which the process is conducted. In some embodiments, a temperature between about 140° F. and about 170° F. is provided for a period of time ranging from about 12 hours to about 336 hours. In alternate embodiments, a temperature between about 140° F. and about 170° F. is provided for a period of time ranging from about 12 hours to about 24 hours, from about 24 hours to about 48 hours, from about 48 hours to about 96 hours, from about 96 hours to about 168 hours, from about 168 hours to about 226 hours, or from about 226 hours to about 336 hours.

The heating is conducted in a sealed vessel or under reflux such that evaporation of volatile compounds is prevented. The pressure inside the vessel can and will vary in different embodiments of the disclosure. In general, the internal pressure of the vessel housing the reaction components climbs to a maximum of about 6 pounds per square inch (psi). The typical range of pressures in the vessel is between 2 psi and 15 psi, but can be altered to relieve pressure and maintain an operating pressure of less than 1 psi while still achieving the desired chemical reactions.

In one embodiment, the temperature is maintained between about 140° F. and about 150° F. for a period of time ranging from about 168 hours to about 226 hours.

In another embodiment, the temperature is maintained between about 150° F. and about 160° F. for a period of time ranging from about 24 hours to about 72 hours.

Generally, heat is applied continuously through the given time period. But, heat may also be provided for the given time period in a manner that is not continuous, for example, at intervals so long as heat is provided totaling the stated time period. At the end of this time period, a first distilled spirit mixture is provided. In this embodiment of the disclosure, the first distilled spirit mixture produced by the heat process is further reacted as described below.

Figure 7:
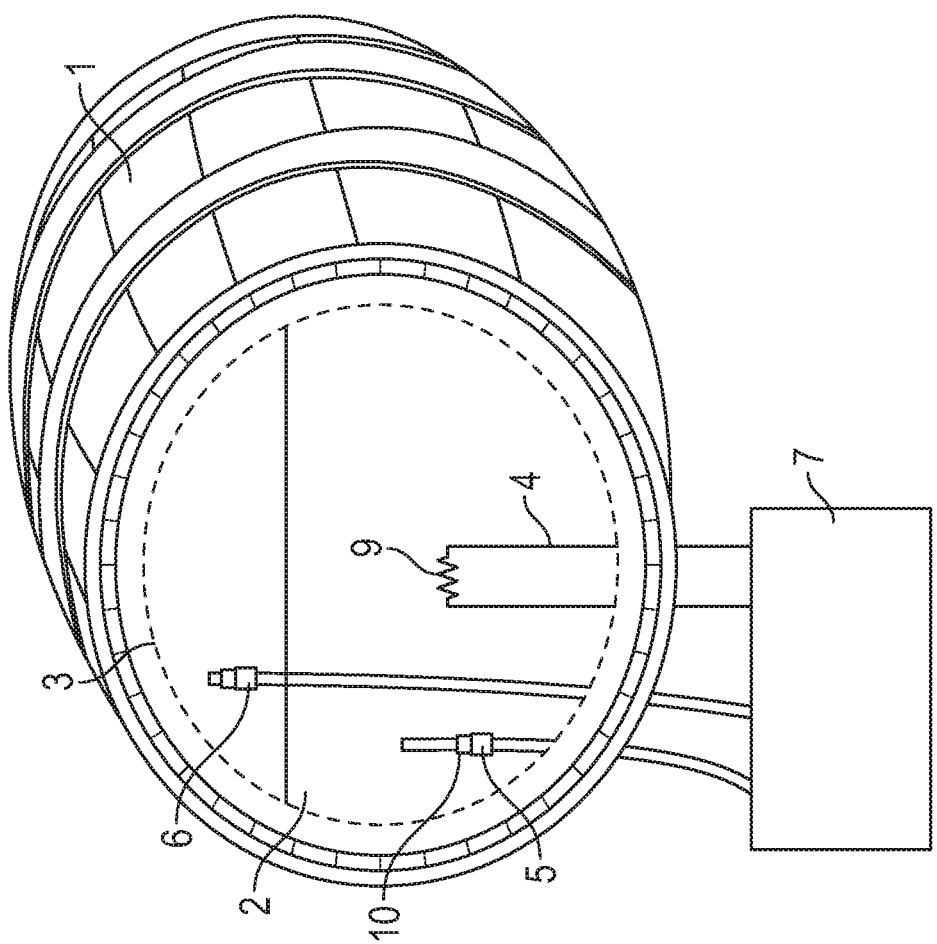
FIG. 7 depicts a wooden barrel for the heat process with a cutaway to show the barrel's internals.

The heat process may be conducted in an apparatus as shown in FIG. 7, which shows a cutaway view of one possible internal configuration. The vessel 1 may be a wooden barrel.

Figure 8:
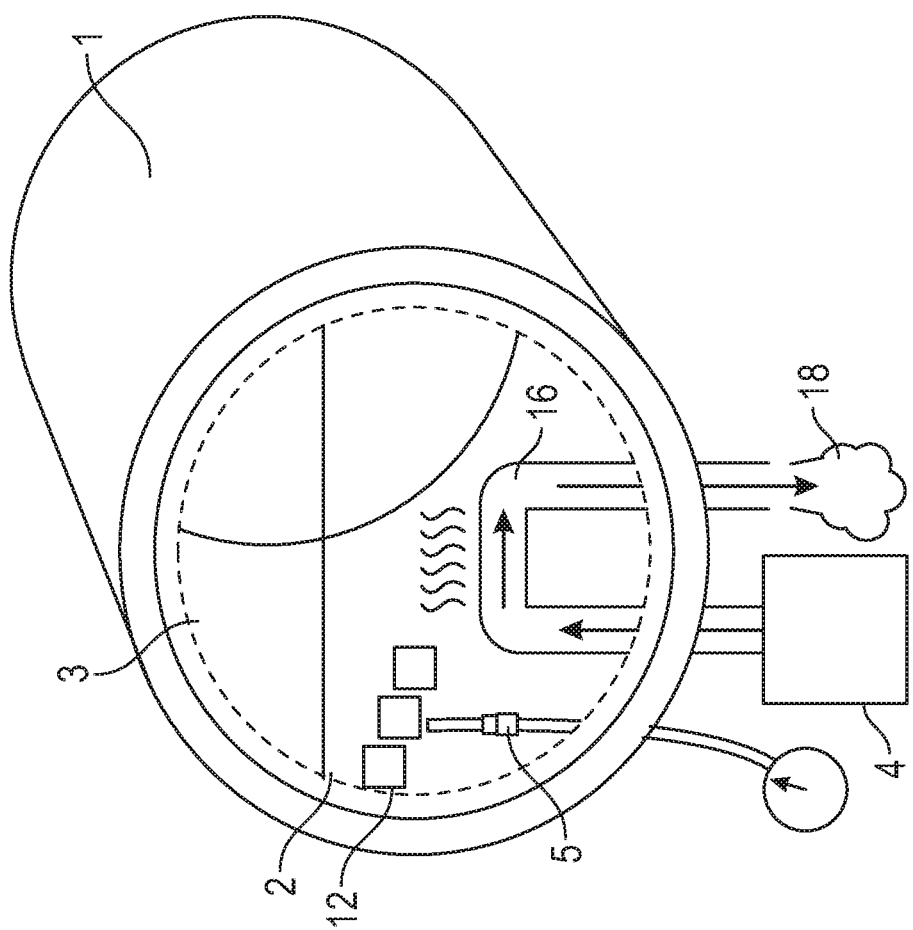
FIG. 8 depicts a sealed vessel for the heat process with a cutaway to show the vessels internals.

In the embodiment depicted in FIG. 8, a cutaway is shown using dashed lines to reveal another possible internal confirmation of the vessel 1, where vessel 1 may be a stainless steel container. In this embodiment, the wood 12 is provided as chips, planks, pellets, or powder and submerged in or floating on top of the distillate 2.

For both FIG. 7 and FIG. 8, heat may be applied to the distillate 2 inside the vessel 1 via a heat source 4. In one embodiment, the vessel is sealed under pressure. In another embodiment, the vessel is heated under reflux to prevent evaporation of volatile compounds. Any method for introducing sufficient heat to the distillate including an internal electrical heating element 9 may be used. In such an embodiment, temperature may be controlled by manipulating electrical current in the internal electrical heating element 9 circuit. In alternate embodiments the heat source 4 is external and may be used with a conduit 16, conductor, or the like. In one non-limiting example, steam 18 may be created using an external boiler as the heat source 4 in one embodiment, then passed through a conduit 16 running through the vessel 1, wherein a conductive portion 16 of the conduit is submerged in the distillate 2. In such an embodiment, the temperature of the distillate 2 may be controlled by varying the amount of steam 18 produced by the boiler. Such control may be provided by valves or similar means that are not pictured.

In one embodiment, the temperature of the distillate 2 in the vessel 1 is brought up to a temperature of about 160° F. for a period of up to 48 hours. This process simultaneously extracts wood derived compounds and acids, some of which are thought to be esterification catalysts. In one embodiment, the temperature of the distillate is measured via a temperature sensor 5. Any known temperature sensor may be used. The temperature of the distillate 2 may be controlled by manually manipulating the heat source 4. In an alternate embodiment, an electronic temperature sensor is coupled 10 to a controller 7. The controller 7 may be configured to present an alert (e.g., flash a light, produce a sound, produce an electrical signal, transmit a text message, e-mail or other electronic communication, etc.) when the temperature of the distillate 2 is outside of a provided range. Optionally, the controller 7 may be coupled to the heat source 4, in which case, the controller is configured to manipulate the heat source to keep the temperature of the distillate 2 within the provided range.

Heating in accordance with the disclosure triggers the esterification of free volatile acids and alcohols in the distillate 2, while the headspace 3 provides for reflux within the vessel 1 allowing any weak acids to be rapidly extracted from the wood. These weak acids, in combination with elevated temperatures, appear to help catalyze the esterification of free acids in the distillate per the Fischer process, which would otherwise take many years in traditional containers.

The pressure inside the container may be measured by a pressure sensor 6. The pressure sensor 6 may be coupled to the controller 7. The pressure sensor may be configured to provide alerts if the pressure becomes too high. The pressure sensor may optionally be configured to communicate to open a release valve if the pressure is too high.

(ii) Removal of Distilled Spirit Mixture

The first heat-treated distilled spirit mixture provided in step (i) is generally allowed to cool and a portion is removed and then exposed to an actinic light process in step (iii).

In an embodiment, the amount of first heat-treated distilled spirit mixture removed from step (i) can and will vary depending upon the parameters used in the subsequent step(s). In an embodiment, the amount of first heat-treated distilled spirit mixture removed from step (i) may be from about 1% to about 99% of the total volume. In some embodiments, the amount of first heat-treated distilled spirit mixture removed from step (i) may be from about 1% to about 99%, from about 1% to about 90%, from about 1% to about 85%, from about 1% to about 80%, from about 1% to about 75%, from about 1% to about 70%, from about 1% to about 65%, from about 1% to about 60%, from about 1% to about 55%, from about 1% to about 50%, from about 1% to about 45%, from about 1% to about 40%, from about 1% to about 35%, from about 1% to about 30%, from about 1% to about 25%, from about 1% to about 20%, from about 1% to about 15%, or from about 5% to about 15% of the total volume. In other embodiments, the amount of first heat-treated distilled spirit mixture removed from step (i) may be from about 1% or about 10% of the total volume.

(iii) Actinic Light Process

In accordance with one embodiment of the disclosure, an amount of the first heat-treated distilled spirit mixture is contacted with wood and actinic light having a wavelength spectrum in the range of 400 nm to 1000 nm for at least 2 hours to give a heat-treated and actinic light-treated distilled spirit.

The actinic light process takes place in a container that allows amounts of light in the UV-Visible spectrum to pass through. In a brief experiment, the inventor compared the UVC $\mu W/cm^2$ and UVA/B $\mu W/cm^2$ found in the actinic light stream used to mature the spirits to UVC and UV A/B $\mu W/cm^2$ produced from sunlight at noon in Morgan Hill, Calif. The $\mu W/cm^2$ were evaluated using a General Instruments UV512C UVC meter and a General Instruments UV513AB. The UVC $\mu W/cm^2$ reaching the spirits were found to be between 10-20 $\mu W/cm^2$ as compared with 15 $\mu W/cm^2$ found in the sunlight. The combined UVA and UVB $\mu W/cm^2$ reaching the maturing spirit were found to be 3500 $\mu W/cm^2 +/- 1000$ $\mu W/cm^2$ as compared with 5000 $\mu W/cm^2$ in the measured sunlight. This experiment shows that the concentration of UV light in the stream of actinic light responsible for playing a role in maturing the spirit is no greater than the concentration of UV light in sunlight, whereas the other wavelengths are significantly higher in proportion to sunlight. The container is filled with an amount of first heat-treated distilled spirit to be processed and is also generally filled with wood as described in the previous step. In one embodiment, glass carboys are used. The actinic light may come from a variety of sources including natural, synthetic, or a combination thereof. Generally, the exposure in this step can be at least two hours. In some embodiments, the exposure can be up to 336 hours.

In an alternative embodiment, the exposure in this step can be at least 2,280,000 lux hours, but sometimes as high as 20,000,000 lux hours. In other embodiments, the total exposure is at least 1,000,000 lux hours, at least 1,500,000 lux hours, at least 2,000,000 lux hours, at least 2,500,000 lux hours, or at least 3,000,000 lux hours. Where very high concentrations of the chemical markers described herein are sought even longer exposures might be appropriate.

In one embodiment, an amount of first heat-treated distilled spirit mixture is exposed to the entire broad spectrum of wavelengths from 400 nm to 1000 nm. In an alternative embodiment, specific wavelengths of the light found in the 400 nm to 1000 nm range may be concentrated in relation to others to produce varying effects in the maturing spirits. For example, wavelengths used may be selected from, but are not limited to, about 400 nm to about 600 nm, from about 550 nm to about 650 nm, from about 600 nm to about 700 nm, from about 650 nm to about 750 nm, from about 700 nm to about 800 nm, from about 750 nm to about 850 nm, from about 800 nm to about 900 nm, from about 850 nm to about 950 nm, or from about 900 nm to about 1000 nm. In particular, the wavelength may range between about 600 nm and about 1000 nm. This process may also be used to isolate the wavelengths most responsible for the effects observed in the spirit maturation process. Where specific temperatures are needed to trigger the reactions with the actinic light, heaters may be used in conjunction with special lamps which produce specific wavelengths of light at a specific temperature. Using specific wavelengths alone, or with heaters, to mature the spirit, would allow for lower energy consumption and lower total exposure time or lower $\mu W/cm^2$ to accomplish the same tasks.

The time period over which the actinic light process is conducted can and will vary over different embodiments. Where natural light is used, the total exposure to actinic light may range from about 100 hours to about 500 hours, from about 250 hours to about 750 hours, from about 500 hours to about 1000 hours, from about 750 hours to about 1250 hours, or from about 1000 hours to about 1500 hours. Where synthetic lights are used, the total exposure to actinic light may range from about 2 hours to about 12 hours, from about 12 hours to about 24 hours, from about 24 hours to about 48 hours, or from about 48 hours to about 96 hours. If artificial lights are used, the time required to treat the spirit in the actinic light process is increased or decreased proportionally to the output of the artificial lights measured in $\mu W/cm^2$ within the spectrum of 400 nm to 1000 nm, or within the spectrum of wavelength from about 400 nm to about 600 nm, from about 550 nm to about 650 nm, from about 600 nm to about 700 nm, from about 650 nm to about 750 nm, from about 700 nm to about 800 nm, from about 750 nm to about 850 nm, from about 800 nm to about 900 nm, from about 850 nm to about 950 nm, or from about 900 nm to about 1000 nm.

The actinic light process may be conducted below the boiling point of the spirit. In some embodiments, the amount or duration of actinic light is controlled, for example, by exposing the spirit to light in a discontinuous manner, by cooling the spirits, by temporarily shielding the spirit from the actinic light, or by other methods for controlling temperature that are known in the art. This process may also be carried out under reflux to prevent the evaporation of volatile compounds.

Although it has been shown experimentally that pressure, in particular pressure elevated above atmospheric pressure, is not critical to the actinic light processing, the actinic light processing is generally conducted at atmospheric pressures. During the actinic light processing the wood off gases thereby increasing the pressure inside the vessel but may be optionally vented to maintain a pressure level below about 10 psi. The actinic light processing step may accommodate higher or lower pressures depending on the characteristics and structure of the vessel and eliminating the need for optional venting.

In one embodiment, a tungsten halogen bulb is used to provide the actinic light. The bulb has an average light temperature of 2900° K, and can produce light in a broad spectrum of wavelengths, including wavelengths from 400 nm to 1000 nm. The spirit can be exposed to the light in a period of at least 2 hours. In at least one embodiment, the spirit is placed in clear containers where about 100 liters of spirit cover a square meter. The area is illuminated to about 190,000 lux with the light being toggled off and on in periods of about 2 to about 4 hours to reach a total exposure of 4,500,000 lux hours. Lux hours, as used herein, describes the light exposure in a given hour because it describes the total luminescence in a given time. Radiant flux measurements were unavailable because the data was not available.

In another embodiment, a distilled spirit is placed in a translucent jar that was kept in a greenhouse for 168 hours to achieve a total of approximately 4,200,000 lux hours.

In another embodiment, twenty 500-W halogen bulbs are used to provide light to seventy jars. The lights are toggled on and off for three days to provide the total lux hours needed for the reaction.

In still another embodiment, 500-W halogen bulbs are shined on both sides of a glass jar. The lights are toggled on and off for 14 hours to provide the total lux hours needed for the reaction.

When the actinic light processing is complete, the resulting amount of first heat-treated and actinic light-treated spirit mixture is removed from the light source.

(iv) Transfer Process

The resulting amount of first heat-treated and actinic light-treated spirit mixture is generally transferred to the first heat-treated distilled spirit mixture from step (i) that was not subjected to the actinic light process to give a combined mixture of first heat-treated distilled spirit and first heat-treated and actinic light-treated distilled spirit mixture.

A person of ordinary skill in the art would appreciate that all or a portion of the first heat-treated and actinic light-treated spirit mixture may be transferred to all of the first heat-treated distilled spirit mixture from step (i) that was not subjected to the actinic light process to give a combined mixture of first heat-treated distilled spirit and first heat-treated and actinic light-treated distilled spirit mixture. Alternatively, all or a portion of the first heat-treated and actinic light-treated spirit mixture may be transferred to a portion of the first heat-treated distilled spirit mixture from step (i) that was not subjected to the actinic light process to give a combined mixture of first heat-treated distilled spirit and first heat-treated and actinic light-treated distilled spirit mixture.

(v) Second Thermal Process

The sequential process further involves a temperature process conducted with the resulting mixture from Section A(iv). In this regard, the combined mixture of first heat-treated distilled spirit and first heat-treated and actinic light-treated distilled spirit mixture is heated to maintain the temperature of between about 140° F. and about 170° F. for a period of time ranging from about 12 hours to about 336 hours in a sealed vessel or under reflux such that evaporation of volatile compounds is prevented to produce a mature spirit.

The process of heat treating the combined mixture of first heat-treated distilled spirit and first heat-treated and actinic light-treated distilled spirit mixture is conducted in the manner described in Section A(i) except that the process is performed on the combined mixture of first heat-treated distilled spirit and first heat-treated and actinic light-treated distilled spirit mixture produced in accordance with Section A(iv). Beneficially, this step triggers a marked reduction in ethyl acetate concentrations generated during the actinic light treatment, shown experimentally to be greater than 60%.

(vi) Optional Further Processing

Optionally, the spirit produced by the process described in Section A(i) through Section A(v) may be followed by one or more additional actinic light or thermal processing steps. For example, a second actinic light processing step may be conducted on the product obtained by the second thermal processing step from step A(v). A third thermal processing step may also be utilized after a second actinic light processing step. In one embodiment, the processes includes a further step of contacting the product or a portion of the product of step A(v) with wood and actinic light at a wavelength spectrum ranging from 400 nm to 1000 nm for at least 2 hours. In still another embodiment, the process further comprises contacting the product or a portion of the product that has been optionally further processed with actinic light with wood at a temperature between about 140° F. and about 170° F. for a period of time ranging from about 24 hours to about 336 to give a first distilled spirit mixture.

In one embodiment, the process or processes may be repeated until a desired chemical marker profile or organoleptic profile is obtained.

B. Mixed Batch Process

In another embodiment, the present disclosure provides a mixed batch process for producing a mature spirit. In this embodiment, the process comprises (a) contacting an amount of a first unmatured distilled spirit with wood at a temperature between about 140° F. and about 170° F. for a period of time ranging from about 24 hours to about 336 hours to give a first distilled spirit mixture; (b) contacting a second unmatured distilled spirit with wood and actinic light at a wavelength spectrum ranging from 400 nm to 1000 nm for at least 2 hours to give a second distilled spirit mixture; and (c) mixing the first and second distilled spirit mixtures to produce the mature spirit. Optionally the mixture may then be heated with wood to between a temperature between about 140° F. and about 170° F. for a period of time ranging from about 24 hours to about 336 hours to produce a mature spirit.

Step (a) of the process is conducted as described in Section (A)(i). The resulting first distilled spirit mixture is not reacted with light. Separately, a second unmatured distilled spirit mixture is treated with actinic light as described in Section (A)(iii). The resulting second distilled spirit mixture is not necessarily treated by the thermal processing step of Section (A)(i). Instead, the first distilled spirit mixture and the second distilled spirit mixture are mixed together.

The first distilled spirit mixture and the second distilled spirit mixture may be mixed in any ratio without limitation. In one embodiment, the ratio ranges between about 70:30 and about 30:70 of the first distilled spirit mixture to the second distilled spirit mixture. In particular embodiments, the ratio of the first distilled spirit mixture and the second distilled spirit mixture is about 70:30, about 65:35, about 60:40, about 55:45, about 50:50, about 45:55, about 40:60, about 35:65, or about 30:70. High concentration products may range from 99:1 to 1:99, or, such as from a ratio of 95:5 to 5:95 of the first distilled spirit mixture to the second distilled spirit mixture.

The mixture of the first distilled spirit mixture and the second distilled spirit mixture is generally allowed to react for at least 1 hour. Without being bound to any theory, it is believed that chemical reactions occur during this time period that enhance the flavor profile over the flavor profile of the separately produced first distilled spirit mixture and the second distilled spirit mixture.

In a different embodiment, the process comprises (a) mixing an amount of a first actinic light-treated spirit mixture from Section A(iii) and a second actinic light-treated spirit mixture from Section A(iii) to give a mixed actinic light-treated spirit mixture and (b) subjecting the mixed actinic light-treated spirit mixture to the thermal process as described above in Section A(i) or Section A(v).

In a different embodiment, the process comprises (a) mixing an amount of a first actinic light-treated spirit mixture from Section A(iii) with an amount of first unmatured distilled spirit and (b) subjecting the mixed actinic light-treated spirit mixture to the thermal process as described above in Section A(i) or Section A(v).

In a further embodiment, the process for producing a mature spirit, the process comprising (a) providing heat to a mixture consisting essentially of an unmatured distilled spirit and wood, to maintain a temperature of between about 140° F. and about 170° F. for about 24 hours to about 336 hours to give a distilled spirit mixture; (b) removing an amount of the distilled spirit mixture from step (a); (c) contacting the amount of the distilled spirit mixture with wood and actinic light at a wavelength spectrum ranging from 400 nm to 1000 nm for at least two hours to give an actinic light-treated distilled spirit mixture; (d) mixing the actinic light-treated distilled spirit mixture with an amount of an unmatured distilled spirit to give an unmatured distilled spirit and actinic light-treated distilled spirit mixture; and (e) providing heat to the unmatured distilled spirit and actinic light-treated distilled spirit mixture to maintain a temperature of between about 140° F. and about 170° F. for about 12 hours to about 336 hours to produce the mature spirit.

In a different embodiment, the process for producing a mature spirit, the process comprising (a) containing a mixture consisting essentially of a first unmatured distilled spirit and wood at a wavelength spectrum ranging from 400 nm to 1000 nm for at least two hours to yield a actinic light-treated distilled spirit mixture; (b) transferring the actinic light-treated distilled spirit mixture or a portion thereof to a second unmatured distilled spirit or a portion thereof to yield a combined mixture of heat-treated distilled spirit and unmatured distilled spirit; and (c) providing heat to the combined mixture of heat-treated distilled spirit and second unmatured distilled spirit from step (b) to maintain a temperature of between about 140° F. and about 170° F. for about 12 hours to about 336 hours to produce the mature spirit.

In another embodiment, the process for producing a mature spirit, the process comprising (a) containing a first mixture consisting essentially of an unmatured distilled spirit and wood at a wavelength spectrum ranging from 400 nm to 1000 nm for at least two hours to yield an actinic light-treated distilled spirit mixture; (b) providing heat a second mixture consisting essentially of an unmatured distilled spirit and wood to maintain a temperature of between about 140° F. and about 170° F. for about 12 hours to about 336 hours to yield a heat-treated distilled spirit mixture; (c) combining the actinic light-treated distilled spirit mixture or a portion thereof and the heat-treated distilled spirit mixture or a portion thereof to yield a combined mixture of an actinic light-treated distilled spirit and heat-treated distilled spirit; and (d) providing heat to the actinic light-treated distilled spirit and heat-treated distilled spirit to maintain a temperature of between about 140° F. and about 170° F. for about 12 hours to about 336 hours to yield a mature spirit.

C. Production of a Matured Spirit by Measuring Chemical Markers

In still another embodiment, the disclosure provides a process for producing a spirit having characteristics of FIG. 5 or FIG. 6, as described herein. The process comprises (a) obtaining a marker concentration of an ester in a target matured distilled spirit thereby giving a target marker concentration, such as ethyl decanoate, as shown in FIG. 5 or FIG. 6, (b) contacting an unmatured distilled spirit with wood and processing as described in Sections A-C to form a distilled spirit mixture, measuring the marker concentration of the distilled spirit mixture, and (d) processing the distilled spirit mixture as described in Sections A-C until the marker concentration of the distilled spirit mixture reaches the target marker concentration.

Once the chemical marker concentration of the distilled sprit mixture is obtained it may be compared to the target marker concentration in order to determine if heating and/or actinic light treating steps as described in Sections A-C can be discontinued. When the target concentration is not met, heating and/or light treatment steps are repeated. Thus, the method provides a tunable process for producing a distilled spirit having characteristics associated with, for example, FIG. 5 or FIG. 6. In one embodiment, the chemical marker associated with a matured distilled spirit may be ethyl decanoate. The process disclosed above, however, is not limited to ethyl decanoate, but can be any other ester that has higher concentrations in a matured distilled spirit as compared to an unmatured distilled spirit. Esters are ideal markers for a heat process because the heat process excels at forming esters as opposed to other semi-volatile compounds like sinapaldehyde.

Markers for the process include, but are not limited to ethyl decanoate, ethyl dodecanoate, ethyl octanoate, ethyl butyrate, and ethyl hexadecanoate. In some embodiments, volatile esters can be used as chemical markers. But, semi-volatiles behave more predictably during processing.

D. Wood Washing

In still another embodiment, where higher concentrations of a specific ester are desired, the wood described in Sections A-D above is washed prior to use in the method. Wood washing has the effect of increasing the concentrations of certain chemical markers that are important to the flavor of the matured spirit. In particular, wood washing prior to conducting the method can lead to a higher ethyl acetate concentration in the matured spirit.

Wood washing may be conducted by contacting the compound described below with wood. This contacting includes submerging the wood for a period of time in a solution containing the compound or by pouring a solution containing the compound over the wood.

In one embodiment, the wood is washed with a carboxylic acid containing 1 to 10 carbon atoms. The carboxylic acid may be selected from, for example, acetic acid, propionic acid, butanoic acid, pentanoic acid, hexanoic acid, heptanoic acid, octanoic acid, nonanoic acid, decanoic acid, branched carboxylic acids such as isobutyric acid, and aromatic acids such as benzoic acid and 2-phenylacetic acid.

The carboxylic acid may be diluted in water for the washing process. For example, the carboxylic acid can be a dilute solution having a concentration from about 0.0001% and about 1% by volume, or about 1% to about 10% by volume of the carboxylic acid, or the solution may be concentrated to about 20% by volume, about 30% by volume, about 40% by volume, about 50% by volume, about 60% by volume, about 70% by volume, about 80% by volume, about 90% by volume, or higher.

In one embodiment, the wood is washed with vinegar (i.e., a dilute solution of acetic acid in water). When wood washing is conducted with any one of the processes described in Sections A-D, the final matured spirit has higher ethyl acetate concentrations. For example, the ethyl acetate concentration may be increased by 1.5× or more compared to spirit matured using this process without the vinegar washing. These higher concentrations can give flavors characteristic to whiskeys such as bourbon and rye whiskeys where higher ethyl acetate concentrations are common.

E. Negative Pressure Processing

In combination with one or more processes disclosed in Sections A-E herein, air is percolated through a distilled spirit in a container with a headspace until the alcohol concentration of the distilled spirit is reduced. "Percolating" refers to gas aspirating or filtering gradually through a porous surface or substance. The air may be untreated air from the ambient atmosphere, or it may be filtered, dried, and or deoxygenated air. Alternatively, the air may comprise one or more gases selected from the group consisting of nitrogen, oxygen, argon, water, carbon dioxide, and helium, which are the principal gases of the terrestrial atmosphere.

In particular, the concentration of water in the air may be adjusted to attain a particular "relative humidity," which is the ratio of the amount of water vapor actually present in the air to the greatest amount possible at the same temperature. Without wishing to be bound by theory, a high relative humidity leads to a net loss of alcohol, whereas a low relatively humidity leads to a net loss of water. The relative humidity (RH) of the air may be selected from between about 0% and about 100%, such as between about 0% and about 10%, between about 10% and about 20%, between about 20% and about 30%, between about 30% and about 40%, between about 40% and about 50%, between about 50% and about 60%, between about 60% and about 70%, between about 70% and about 80%, between about 80% and about 90%, or between about 90% and about 100%. The relative humidity may be selected to mimic a geographical location, for example, Kentucky, Scotland, or Jamaica.

Generally, the air is introduced into to the container is at about atmospheric pressure. An air inlet at the bottom of the container permits the air to contact the distilled spirits. In large containers, the air inlet may be fluidly connected to a diffuser or perforated disk to distribute the air over a larger surface area, thus enhancing contact between the air and the distilled spirit.

During the process, the headspace of the container is under controlled negative gauge pressure. Although the container is open to the atmosphere or an air source, thereby allowing the air to percolate through, the headspace is enclosed by the top surface of the distilled spirit and the walls of the container, thereby allowing a negative gauge pressure to be exerted. Absolute pressure is zero-referenced against a perfect vacuum, so it is equal to gauge pressure plus atmospheric pressure. Gauge pressure is zero-referenced against ambient air pressure, so it is equal to absolute pressure minus atmospheric pressure, wherever the gauge is located. In stating the gauge pressure, negative signs may be omitted, but are used herein for clarity.

"Inch of mercury" (inches of Hg, inHg, or "Hg) is a unit of measurement for pressure exerted by a column of mercury of 1 inch (25.4 mm) in height at the standard acceleration of gravity. This simple gauge measures the difference in the levels of the mercury from 0 inches at atmospheric pressure up to 29.92 inches of Hg at the best vacuum attainable. Typically, this scale is shown as 0 to 30 inches of Hg on gauges, such a Bourdon dial gauges.

The range of gauge pressures used herein can and will vary. The gauge pressure of the headspace inside the container may be between about −25 inHg and about −30 inHg, such as between about −25 inHg and about −25.5 inHg, between about −25.5 inHg and about −26 inHg, between about −26 inHg and about −26.5 inHg, between about −26.5 inHg and about −27 inHg, between about −27 inHg and about −27.5 inHg, between about −27.5 inHg and about −28 inHg, between about −28 inHg and about −28.5 inHg, between about −28.5 inHg and about −29 inHg, between about −29 inHg and about −29.5 inHg, or between about −29.5 inHg and about −30 inHg. The gauge pressure may be between about −27 inHg and about −28 inHg. In particular, the gauge pressure may be about −27.75 inHg.

During the process, the distilled spirit may chill due to evaporative cooling, especially in large batches. As such, the temperature of the distilled spirit may be heated during the process to hold the temperature constant. Alternatively, the temperature may be lowered or raised relative to the ambient conditions. In these embodiments, the temperature may range from between about 0° F. and about 140° F., such as between about 0° F. and about 10° F., between about 10° F. and about 20° F., between about 20° F. and about 30° F., between about 30° F. and about 40° F., between about 40° F. and about 50° F., between about 50° F. and about 60° F., between about 60° F. and about 70° F., between about 70° F. and about 80° F., between about 80° F. and about 90° F., between about 90° F. and about 100° F., between about 100° F. and about 110° F., between about 110° F. and about 120° F., between about 120° F. and about 130° F., or between about 130° F. and about 140° F. The temperature may be greater than 0° F. The temperature may be less than about 140° F.

The volume of distilled spirits used in the process can and will vary. For example, the volume may range from about 100 mL to about 10,000 L, such as between about 100 mL and about 500 mL, between about 500 mL and about 1 L, between about 1 L and about 1.5 L, between about 1.5 L and about 2 L, between about 2 L and about 5 L, between about 5 L and about 10 L, between about 10 L and about 50 L, between about 50 L and about 100 L, between about 100 L and about 500 L, between about 500 L and about 1,000 L, between about 1,000 L and about 2,000 L, between about 2,000 L and about 5,000 L, or between about 5,000 L and about 10,000 L. The volume may be greater than about 100 mL. The volume may be less than about 10,000 L. The volume may be about 325 mL. The volume may be about 750 mL. The volume may be about 1.5 L.

The process disclosed herein decreases the concentration of alcohol within the distilled spirit, and thereby selectively removes the most volatile organic compounds and azeotropes and/or increases the concentration of desirable chemical markers. The disclosed process is very sensitive and is preferably monitored carefully to the target alcohol concentration. (As used throughout this disclosure, "alcohol" without further qualification takes its common meaning of "ethanol.") The alcohol concentration of the distilled spirit may be determined during the process using an in-line density meter connected to the container. In these embodiments, the vacuum chamber should be fitted with an in-line density meter to carefully monitor the changes in alcohol percentage in the spirit, allowing for very precise processing. An in-line density meter is critical to scaling the system to larger volumes. If the disclosed process is run too long, the distilled spirits becomes very bitter. If the disclosed process is run for too short of a time, the distilled spirit retains chemical markers which gives the perception of heat to a consumer.

The disclosed process can be used on either full strength spirits or bottling strength spirits with the adjustments to the target alcohol concentration, as described herein. The unmatured distilled spirit, as described herein, has an alcohol content of at least 50% by volume. In some embodiments, the alcohol content of the unmature distilled spirit is between 40% and 95.5% by volume. "Full strength" is the strength of distilled spirit straight from the cask (barrel) with no water added. Full strength spirits typically have an alcohol concentration of greater than 60% by volume, such as greater than 65%, as greater than 70%, as greater than 75%, as greater than 80%, as greater than 85%, or as greater than 90% by volume. The initial concentration of alcohol may be between about 40% and about 95.5% by volume. "Bottling strength" refers to the concentration to which distilled spirits are diluted to when transferring from the cask (barrel) to a bottle, which is between about 40% and about 57% by volume for most bottled spirits, such as between about between about 40% and about 45% by volume, between about 45% and about 50% by volume 50% and about 55% by volume, or between about 52% and about 57% by volume.

As such, the alcohol concentration of full strength distilled spirit may be reduced by between about 1% and about 2% by volume, such as between about 1.1% and about 1.2% by volume, between about 1.2% and about 1.3% by volume, between about 1.3% and about 1.4% by volume, between about 1.4% and about 1.5% by volume, between about 1.5% and about 1.6% by volume, between about 1.6% and about 1.7% by volume, between about 1.7% and about 1.8% by volume, between about 1.8% and about 1.9% by volume, or between about 1.9% and about 2.0% by volume. As such, the alcohol concentration of bottle strength distilled spirit may be reduced by between about 0.3% and about 1% by volume, such as between about 0.3% and about 0.4% by volume, between about 0.4% and about 0.5% by volume, between about 0.5% and about 0.6% by volume, between about 0.6% and about 0.7% by volume, between about 0.7% and about 0.8% by volume, between about 0.8% and about 0.9% by volume, or between about 0.9% and about 1.0% by volume.

Unlike traditional methods, which lose between about 30% and about 50% of the volume to evaporation in the barrelhouse, the disclosed process removes less than about 20% of the total volume of the spirit, while creating substantially the same flavor characteristics as associated with very old spirits. For example, the disclosed process may remove less than about 20% of the total volume of the spirit, such as less than about 19%, less than about 18%, less than about 17%, less than about 16%, less than about 15%, less than about 14%, less than about 13%, less than about 12%, less than about 11%, less than about 10%, less than about 9%, less than about 8%, less than about 7%, less than about 6%, less than about 5%, less than about 4%, less than about 3%, less than about 2%, or less than about 1% of the total volume of the spirit. As described above, the parameters selected for the process determine whether the net loss from the lost volume is net water or net alcohol.

In particular, the present disclosure provides a process for maturing a distilled spirit. (a) Air percolated through a distilled spirit in a container with a headspace at a gauge pressure between about −27 inHg and about −28 inHg until alcohol concentration of the distilled spirit is reduced by between about 1% and about 2% by volume, as determined by an in-line density meter connected to the container. In this process, the total volume of the spirit is reduced by about 10% or less. The distilled spirit begins step (a) with an alcohol concentration greater than 60% by volume. And then optionally, (b) air is percolated through the distilled spirit of step (a) in the container with the headspace at a gauge pressure between about −27 inHg and about −28 inHg until the alcohol concentration of the distilled spirit is reduced by an additional amount of between about 0.3% and about 1% by volume, as determined by the in-line density meter. And then (c) the distilled spirit of step (b) is diluted with water to an alcohol concentration between about 50% and about 55% by volume. And then (d) air is percolated air through the diluted distilled spirit in the container with the headspace at a gauge pressure between about −27 inHg and about −28 inHg until the alcohol concentration of the diluted distilled spirit is reduced by an additional amount of between about 0.3% and about 1% by volume, as determined by the in-line density meter.

As described elsewhere in this disclosure, the distilled spirit may be selected from the group consisting of sugar cane spirits, grain spirits, fruit spirits, or agave spirits. Alternatively, the distilled spirit may be selected from the group consisting of rum, tequila, mescal, whiskey, brandy, gin, and vodka.

The gauge pressure in each of step (a) and step (c) may be about −27.75 inHg. The temperature of the distilled spirit may be held constant during each of step (a), step (b), and step (c).

The concentration in the distilled spirit may be decreased for one or more chemical markers selected from the group consisting of methanol, $C_2$-$C_6$ fatty acids, and $C_2$-$C_6$ fatty acid esters. Alternatively or in addition, the concentration in the distilled spirit may be increased for one or more chemical markers selected from the group consisting of vanillin, phenylated esters, $C_7$-$C_{24}$ fatty acid esters, and phenolic aldehydes. In particular, the distilled spirit may be characterized by an increase in concentration of sinapaldehyde, ethyl dodecanoate, and ethyl decanoate. The distilled spirit may characterized by an increase in concentration of sinapaldehyde. The total loss of volume of distilled spirits during the process may be less than about 20%.

Optionally, the spirit produced by the process described herein may be followed by one or more additional pressure processing steps. In one embodiment, the sequential process may be repeated until a desired chemical marker profile is obtained.

The present disclosure also provides a distilled spirit produced according to a process described herein.

The compounds described herein have asymmetric centers. Compounds of the present disclosure containing an asymmetrically substituted atom may be isolated in optically active or racemic form. All chiral, diastereomeric, racemic forms and all geometric isomeric forms of a structure are intended, unless the specific stereochemistry or isomeric form is specifically indicated.

When introducing elements of the present disclosure or the embodiments(s) thereof, the articles "a," "an," "the," and "said" are intended to mean that there are one or more of the elements. The terms "comprising," "including," and "having" are intended to be inclusive and mean that there may be additional elements other than the listed elements.

Having described the disclosure in detail, it will be apparent that modifications and variations are possible without departing from the scope of the disclosure defined in the appended claims.

EXAMPLES

The following examples are included to demonstrate certain embodiments of the disclosure. It should be appreciated by those of skill in the art that the techniques disclosed in the examples represent techniques discovered by the inventors to function well in the practice of the disclosure. Those of skill in the art should, however, in light of the present disclosure, appreciate that many changes can be made in the specific embodiments that are disclosed and still obtain a like or similar result without departing from the spirit and scope of the disclosure, therefore all matter set forth is to be interpreted as illustrative and not in a limiting sense.

Instrumentation

Gas Chromatography Mass Spectrometry (GCMS) Data was obtained using a Shimadazu GCMS Model QP2010 with a Restek Column—Rxi-5Sil MS, 30 meter, 0.24 mmID, 0.24 umdf. Program conditions were as follows:

TABLE 1

Analytical Line 1

| | |
|---|---|
| # of Rinses with Presolvent | :1 |
| # of Rinses with Solvent(post) | :5 |
| # of Rinses with Sample | :1 |
| Plunger Speed(Suction) | :Middle |

TABLE 1-continued

Analytical Line 1

| | |
|---|---|
| Viscosity Comp. Time | :5.0 sec |
| Plunger Speed(Injection) | :High |
| Syringe Insertion Speed | :High |
| Injection Mode | Normal |
| Pumping Times | :3 |
| Inj. Port Dwell Time | :10.0 sec |
| Terminal Air Gap | :No |
| Plunger Washing Speed | :High |
| Washing Volume | :6 uL |
| Syringe Suction Position | −2.0 mm |
| Syringe Injection Position | :0.0 mm |
| Solvent Selection | :All A, B, C |

TABLE 2

GC PARAMETERS

| | |
|---|---|
| Column Oven Temp. | :35.0° C. |
| Injection Temp. | :265.0° C. |
| Injection Mode | :Split |
| Flow Control Mode | :Linear Velocity |
| Pressure | :56.0 kPa |
| Total Flow | :23.9 mL/min |
| Column Flow | :1.12 mL/min |
| Linear Velocity | :38.0 cm/sec |
| Purge Flow | :0.5 mL/min |
| Split Ratio | :20.0 |
| High Pressure Injection | :OFF |
| Carrier Gas Saver | :ON |
| Carrier Gas Saver Split Ratio | :5.0 |
| Carrier Gas Saver Time | :10.00 min |

TABLE 3

OVEN TEMP. PROGRAM

| Rate | Temperature (° C.) | Hold Tim (min) |
|---|---|---|
| | 35.0 | 5.00 |
| 16.00 | 300.0 | 1.44 |

TABLE 4

MS PARAMETERS

| | |
|---|---|
| IonSourceTemp | :220.00° C. |
| Interface Temp. | :280.00° C. |
| Solvent Cut Time | :1.80 min |
| Detector Gain Mode | :Relative |
| Detector Gain | :0.20 kV |
| Threshold | :500 |
| Start Time | :1.80 min |
| End Time | :23.00 min |
| ACQ Mode | :Scan |
| Event Time | :0.50 sec |
| Scan Speed | :1000 |
| Start m/z | :35.00 |
| End m/z | :500.00 |

Comparative Example 1: Fresh Rum

A sample of fresh, unmature pot distilled rum was analyzed by GCMS. FIG. 1 shows the semi-volatile fingerprint of an un-aged pot distilled rum. This is largely defined by a lack of activity for compounds having a retention time ranging from 5 to 30 minutes. Noteworthy characteristics include, but are not limited to, the starting height of peak 1 corresponding to acetyl, peak 2 corresponding to ethyl decanoate, and peak 3 corresponding to ethyl dodecanoate. The absence of a peak for sinapaldehyde, which is described further in later examples, is noteworthy. FIG. 1 also shows an absence of white noise in the chromatogram starting at the 6 minute retention time point.

Concentration of ethyl acetate was measured by direct injection mass spectrometry. The concentration of ethyl acetate was shown to be about 110,000 µg/L.

Comparative Example 2: Rum Aged for 33 Years by Conventional Aging Process

Figure 2:
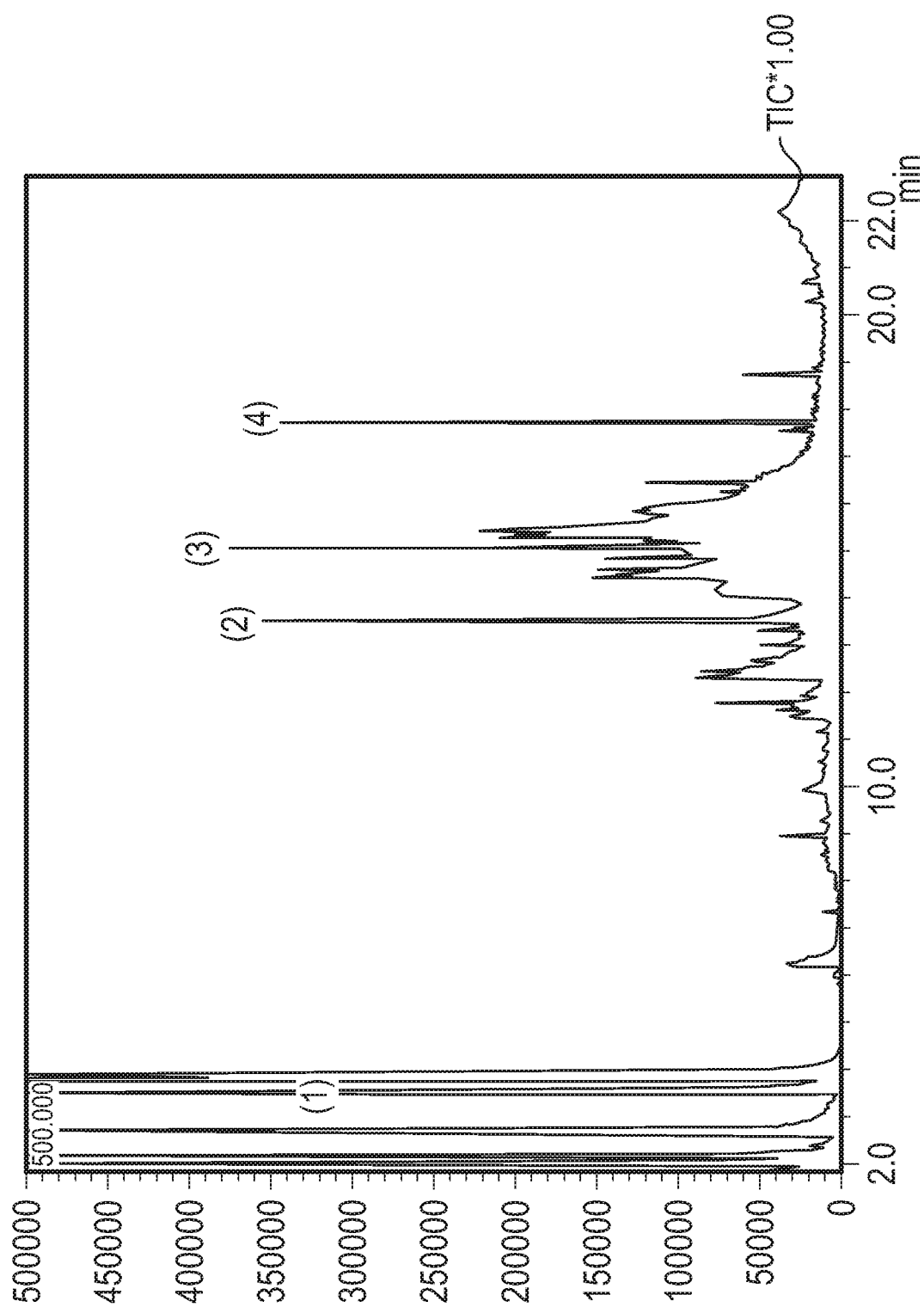
FIG. 2 shows the GCMS chromatogram from a sample of a commercially available rum which has been aged for 33 years by conventional aging techniques.

A sample of a commercially-available rum which has been aged for 33 years by conventional aging processes was also analyzed by GCMS. FIG. 2 illustrates a semivolatiles profile characteristic of 33 year aged pot distilled rums. Key characteristics include the high acetal spike (peak 1) the high ethyl decanoate spike (peak 2) the high ethyl dodecanoate spike (peak 3) and the high sinapaldehyde spike (peak #4). The relative heights of peaks 2, 3, and 4 in relation to each other is also important. Organoleptically maintaining this approximate ratio of peak heights to each other proved significant for creating the flavor characteristics associated with aged rum. Further noteworthy is the cluster of medium level peaks centered on the 15-minute mark (thought to be caramel additives and found to include significant amounts of glucose—this phenomena was also observed in known adulterated rum).

The critical differences between the un-aged rum and the 33-year-old rum, that were ascertainable in the semi-volatile chromatograms included the presence of sinapaldehyde (not found in the white rum) alongside peaks showing significantly elevated ethyl decanoate and ethyl dodecanoate levels (both of which are found in the white rum characterized by relatively low peak values). Finally a significant layer of "white noise" (representing a complex mixture of many semi-volatile compounds) lined the bottom of the chromatogram in the 33-year-old rum and was absent in the un-aged rum.

Concentration of ethyl acetate was measured by direct injection mass spectrometry. The concentration of ethyl acetate was shown to be about 770,000 µg/L. A more typical reading for ethyl acetate in a 33 year-old sample is 200,000 µg/L.

Comparative Example 3: Heat Only Process

Otherwise unprocessed heavy pot distilled rum was added to a stainless steel tank and mixed with charred oak slabs and heated to between 150° F. and 170° F. Temperature was held in that range for 48 hours. FIG. 3 shows the GCMS chromatogram of the resulting product. The GCMS shows promising (but inadequate) developments of acetyl (peak 1) ethyl decanoate (peak 2), ethyl dodecanoate (peak 3) and sinapaldehyde (peak 4). It also shows the development of some white noise. Overall this sample did not produce all of the organoleptic properties displayed in aged rum. The flavor and aroma of the sample was abnormally thin and lacked the smoky/woody flavors found in the 33 year-old sample. Qualitatively it was unable to meet two of the key chemical marker criteria for the production of aged rum. As can be seen, the white noise level was low. The ethyl dodecanoate (peak 3) and sinapaldehyde (peak 4) failed reach peak heights similar to the ethyl decanoate (peak 2).

Concentration of ethyl acetate was measured by direct injection mass spectrometry. The concentration of ethyl acetate was shown to be about 38,000 µg/L.

Comparative Example 4: Actinic Light Only Process

Otherwise unprocessed heavy pot distilled rum was placed in a sealed flint glass jar along with charred oak slabs and placed in a greenhouse for 30 days. The sample was not subjected to any heat treatment. The sample was analyzed by GCMS. The GCMS shows significant development of acetyl (peak 1) ethyl decanoate (peak 2), ethyl dodecanoate (peak 3) and sinapaldehyde (peak 4). It also shows the development of the level of white noise expected in a mature spirit. But, this sample did not produce the organoleptic properties displayed in aged rum. It was extremely bitter. Qualitatively it was unable to meet one key chemical marker criteria for the production of an aged spirit. The sinapaldehyde (peak 4) was extremely high. It was hypothesized that the extreme level of sinapaldehyde was partially causing the bitterness along with some other observed and abnormally high peaks including furfural (peak 5) and syringaldehyde (peak 6).

Concentration of ethyl acetate was measured by direct injection mass spectrometry. The concentration of ethyl acetate was shown to be about 62,000 µg/L.

Example 5: Mixed Batch Heat and Actinic Light Process

Figure 4:
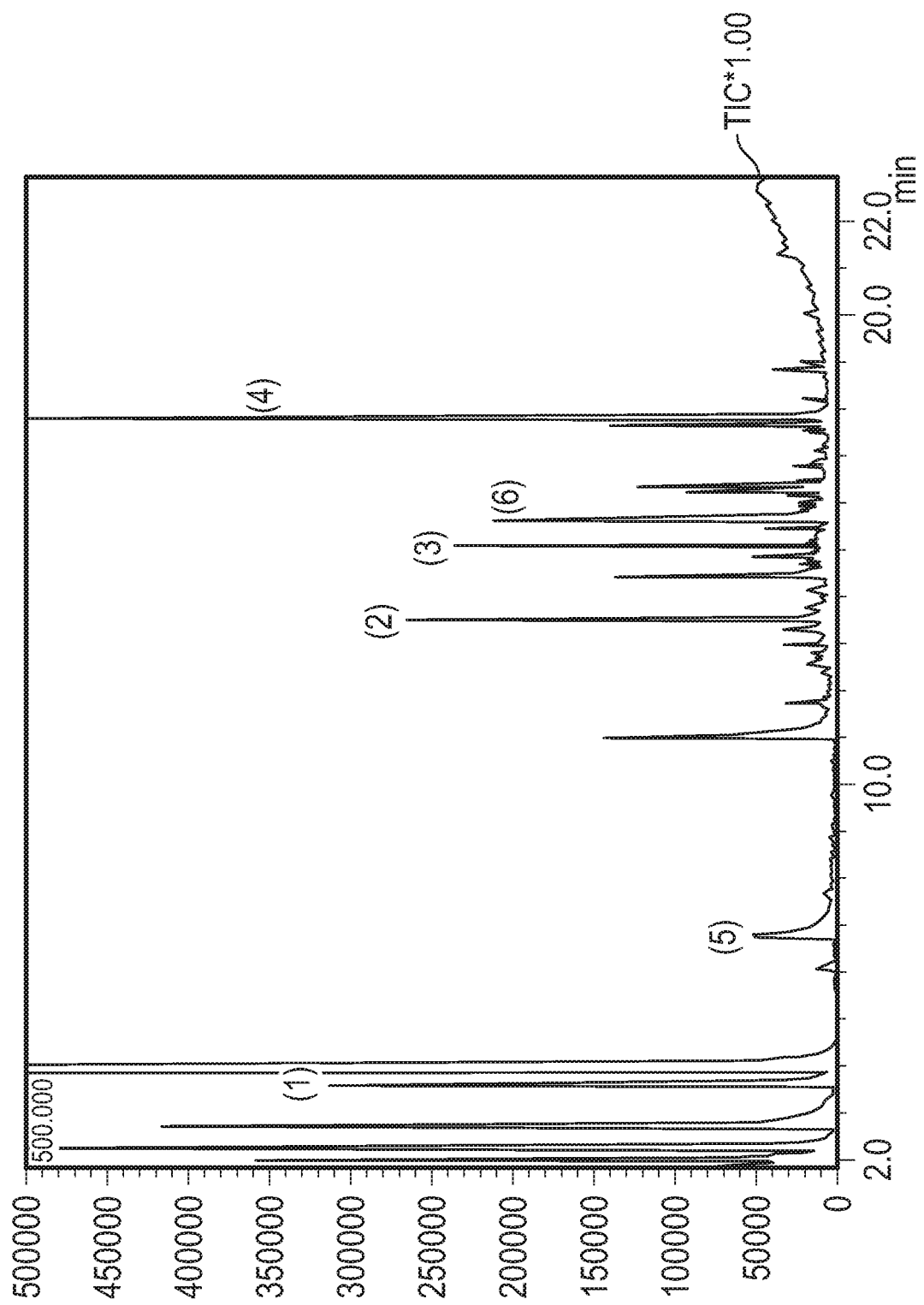
FIG. 4 shows the GCMS chromatogram from a rum sample subjected to actinic light but not to heat in accordance with Example 4.

Otherwise unprocessed heavy pot distilled rum was added to a stainless steel tank and mixed with charred oak slabs and heated to between 150° F. and 170° F. Temperature was held in that range for 48 hours. Separately, an otherwise unprocessed heavy pot still rum was placed in a sealed flint glass jar along with charred oak slabs and placed in a greenhouse for 30 days. The product of the heat treatment and the product of the light treatment were then mixed together with a ratio of 60% of the heat process product and 40% of the actinic light processed rum. This mixture was allowed to react for 24-48 hours. After this time period, the resulting product was analyzed by GCMS. The GCMS chromatogram is shown in FIG. 5. The chromatogram shows some unexpected results along with major developments. The acetyl concentration (peak 1) unexpectedly fell to a concentration lower than that of either of its constituent parts (FIG. 3 and FIG. 4). But, the acetal level was still elevated in comparison to the unprocessed rum (FIG. 1) by a factor of 1.75×. The furfural concentration (peak 5) and syringaldehyde concentration (peak 6) unexpectedly fell sharply correcting the overabundance of these compounds displayed in the actinic light-treated rum (FIG. 4). The ethyl decanoate concentration (peak 2) unexpectedly (and counterproductively) fell to levels lower than those observed in either of the constituent components—yet the peak still remained more than 3× higher than the starting concentration in the unprocessed rum satisfying our minimum criteria for an aged spirit. Ethyl dodecanoate (peak 3) was unaffected by combining the products. Critically, the sinapaldehyde (peak 4) fell to a concentration lower than expected given the extremely high peak found in the actinic light reacted product (FIG. 4). The "white noise" fell significantly and unexpectedly, failing to fully satisfy criteria for an aged spirit. Despite the failure of this product to fully meet some markers of the 33-year-old spirit, this product did produce the organoleptic properties displayed in aged rum, albeit a highly idiosyncratic aged rum. It did not display any of the extreme bitterness found in the actinic light reacted rum (FIG. 4), or the thinness of flavor displayed in the temperature treated rum (FIG. 3). It was observed that the peak heights of ethyl decanoate, ethyl dodecanoate, and sinapaldehyde were all elevated and had come closer to aligning than had been possible in either the heat-treated product or the actinic light-treated product alone. Therefore the mixture of the two products had produced a final product that approached meeting all of the key chemical markers outlined in our definition of a mature spirit.

Concentration of ethyl acetate was measured by direct injection mass spectrometry. The concentration of ethyl acetate was shown to be about 170,000 µg/L.

Example 6: Sequential Temperature and Light Processing

An otherwise unprocessed heavy pot distilled rum was added to a stainless steel tank and mixed with charred oak slabs and heated to between 150° F. and 170° F. Temperature was held in that range for 48 hours. The resulting product was then placed in a sealed flint glass jar along with charred oak slabs and placed in front of a 500-W halogen bulb for 3 days. Seventy glass jars are placed on a shelf surrounded by a total of 20 lights. The lights were toggled on and off in 2-4 hour cycles to prevent boiling. The resulting product was then placed in a stainless steel tank and mixed with charred oak slabs and heated to between 150° F. and 170° F. Temperature was held in that range for 48 hours. The resulting product was analyzed with GCMS.

FIG. 6 shows the GCMS chromatogram from a rum sample that has been processed with both heat and light in accordance with Example 6. It shows some unexpected results along with major developments. Unlike the mixture of the heat and actinic light-treated rum described in FIG. 5, the acetyl concentration (peak 1) is as high as it is in the actinic light reacted rum (FIG. 4) more than 3× the starting concentration found in the unprocessed rum (FIG. 1) satisfying the acetyl chemical marker criteria for an aged spirit. The furfural concentration (peak 5) does not exhibit the overabundance displayed in the actinic light-treated rum (FIG. 4). The ethyl decanoate concentration (peak 2) shows a peak height 25%+/−higher than that found in the mixture of heat treated rum and actinic light reacted rum described in FIG. 5. The peak shows a relative concentration roughly 5× higher than the starting concentration in the unprocessed rum satisfying our minimum ethyl decanoate marker criteria for an aged spirit. The ethyl dodecanoate (peak 3) peak height was identical to that found in the mixture described in FIG. 5 and lines up almost identically with the ethyl decanoate concentration. The sinapaldehyde (peak 4) fell slightly from the light/heat mixture rum described in FIG. 5 critically aligning with the ethyl decanoate (peak 2), and the ethyl dodecanoate (peak 3) satisfying the elusive chemical marker criteria of having peaks 2, 3, and 4 roughly aligned. The "white noise" peaks also rose (as compared to the mixture product displayed in FIG. 5) as a consequence of this modified process satisfying that chemical marker criteria for the production of an aged spirit. As is expected from reading the chromatogram, this product did produce the organoleptic properties displayed in aged rum. It did not display any of the extreme bitterness found in the actinic light reacted rum (FIG. 4), or the thinness of flavor displayed in the temperature treated rum (FIG. 3). It was observed that the peak heights of ethyl decanoate, ethyl dodecanoate, and sinapaldehyde were all elevated and roughly aligned in a way that had not been possible in either the heat-treated product or the actinic light-treated product, or even the mixture of the two (shown in FIG. 5). This process had successfully satisfied all of the key chemical markers outlined in our definition of a mature spirit, elegantly solving the industries "30 years in a barrel" problem. It incidentally and beneficially triggered a marked reduction in ethyl acetate concentrations, shown experimentally to be greater than 60% over the batch process (FIG. 5). The process also produced no evaporation of the finished product as would be expected in conventional barrel aging. The finished product not only mimicked the key marker ratios a traditionally aged product, but ultimately improved the process by shortening the time to maturity, eliminating the evaporation, and reducing the ethyl acetate.

Concentration of ethyl acetate was measured by direct injection mass spectrometry. The concentration of ethyl acetate was shown to be about 59,000 µg/L.

Example 7: Sample Process

An otherwise unprocessed heavy pot distilled rum (25 gallons) was added to a stainless steel tank and mixed with charred oak slabs and heated to between 150° F. and 160° F. Temperature was held in that range for 48 hours. 10% of the remaining product (about 2.5 gallons) was then placed in a sealed flint glass jar along with charred oak slabs and placed in front of 16 500-kW halogen bulbs for 24 hours. The resulting product was then transferred back to the remaining unprocessed pot distilled rum and heated to between 150° F. and 160° F. Temperature was held in that range for 48 hours.

While specific embodiments have been described above with reference to the disclosed embodiments and examples, such embodiments are only illustrative and do not limit the scope of the disclosure. Changes and modifications can be made in accordance with ordinary skill in the art without departing from the disclosure in its broader aspects as defined in the following claims.

What is claimed is:

1. A process for producing a mature spirit, the process comprising:
   (a) providing heat to a mixture consisting essentially of an unmatured distilled spirit and wood, to maintain a temperature of between about 140° F. and about 170° F. for about 12 hours to about 336 hours to give a distilled spirit mixture;
   (b) removing an amount of heat-treated distilled spirit mixture from step (a);
   (c) contacting the removed amount of heat-treated distilled spirit mixture with wood and actinic light at a wavelength spectrum ranging from 400 nm to 1000 nm for from about 12 hours to about 96 hours to yield a heat-treated and actinic light-treated distilled spirit mixture;
   (d) transferring the heat-treated and actinic light-treated distilled spirit mixture or a portion thereof to the remaining heat-treated distilled spirit mixture from step (a) or a portion thereof to yield a combined mixture of heat-treated and actinic light-treated distilled spirit mixture; and
   (e) providing heat to the combined heat-treated and actinic light-treated distilled spirit mixture from step (d) or portion thereof to maintain a temperature of between about 140° F. and about 170° F. for about 12 hours to about 336 hours to produce the mature spirit.

2. The process of claim 1, wherein the unmature distilled spirit is selected from the group consisting of sugar cane spirits, grain spirits, fruit spirits, and agave spirits.

3. The process of claim 1, wherein the unmature distilled spirit is selected from the group consisting of rum, tequila, mescal, whiskey, brandy, and gin.

4. The process of claim 1, wherein the mature spirit is characterized by an increase in sinapaldehyde.

5. The process of claim 1, wherein the mature spirit is characterized by an increase in sinapaldehyde, ethyl dodecanoate, and ethyl decanoate.

6. The process of claim 1, wherein the mature spirit is characterized by amounts of sinapaldehyde, ethyl dodecanoate, and ethyl decanoate that are substantially similar to the relative proportions shown in FIG. 6, as measured by GCMS.

7. The process of claim 1, wherein the mature spirit has an ethyl acetate concentration of about 59,000 µg/L.

8. The process of claim 1, wherein the temperature of step (a) and step (e) is maintained at between about 140° F. and about 150° F. for about 168 hours to about 226 hours.

9. The process of claim 1, wherein the temperature of step (a) and step (e) is maintained at between about 150° F. and about 160° F. for about 24 hours to about 72 hours.

10. The process of claim 1, wherein the process further comprises:
    (f) contacting the mature spirit from step (e) with wood and actinic light at a wavelength ranging from 400 nm to 1000 nm for about 12 hours to about 96 hours.

11. The process of claim 10, wherein the process further comprises:
    (g) heating with wood at a temperature of between about 140° F. and about 170° F. for about 24 hours to about 336 hours.

12. The process of claim 1, wherein the amount of the distilled spirit mixture removed from step (a) is about 1% to about 99% of the total volume.

13. The process of claim 12, wherein the amount of the distilled spirit mixture removed from step (a) is about 1% to about 10% of the total volume.

14. The process of claim 1, wherein the wood is selected from the group consisting of wood strips, wood chips, wood pellets, wood powder, and combinations thereof.

15. The process of claim 1, wherein step (c) is vented to maintain a pressure of about 10 psi.

16. A process for producing a mature spirit, the process comprising:
    (a) providing heat to a mixture consisting essentially of an unmatured distilled spirit and wood; to maintain a temperature of between about 140° F. and about 170° F. for about 12 hours to about 336 hours to give a heat-treated distilled spirit mixture;
    (b) removing an amount of heat-treated distilled spirit mixture from step (a);
    (c) contacting the removed amount of heat-treated distilled spirit mixture with wood and actinic light at a wavelength spectrum ranging from 400 nm to 1000 nm for from about 12 to about 96 hours to yield a heat-treated and actinic light-treated distilled spirit mixture;
    (d) transferring the heat-treated and actinic light-treated distilled spirit mixture or a portion thereof to the remaining heat-treated distilled spirit mixture from step (a) or a portion thereof to yield a combined mixture of heat-treated distilled spirit and heat-treated and actinic light-treated distilled spirit;
    (e) providing heat to the combined mixture of heat-treated distilled spirit and heat-treated and actinic light-treated distilled spirit from step (d) or portion thereof to maintain a temperature of between about 140° F and about 170° F for about 12 hours to about 336 hours to produce the mature spirit; and (f) percolating air through the mature spirit of step (e) in a container with a headspace at a gauge pressure between about −25 inHg and about −30 inHg until the alcohol concentration of the mature spirit is reduced by between about 1% and about 2% by volume and until the total volume of the mature spirit is reduced by about 10% or less.

17. The process of claim 16; wherein the concentration in the mature spirit is decreased for one or more chemical markers selected from the group consisting of methanol; $C_2$-$C_6$ fatty acids, and $C_2$-$C_6$ fatty acid esters.

18. The process of claim 16; wherein the concentration in the mature spirit is increased for one or more chemical markers selected from the group consisting of vanillin, phenylated esters, $C_7$-$C_{24}$ fatty acid esters; and phenolic aldehydes.

19. The process of claim 16, wherein the alcohol concentration of the mature spirit is determined during the process using an in-line density meter connected to the container.

20. The process of claim 16, wherein the gauge pressure is between about −27 inHg and about −28 inHg.

21. The process of claim 20, wherein the gauge pressure is about −27.75 inHg.

22. The process of claim 20, wherein step (c) is vented to maintain a pressure of about 10 psi.

23. A process for producing a mature spirit, the process comprising:
(a) providing heating to a mixture consisting essentially of an unmatured distilled spirit and wood, to maintain a temperature of between about 140° F. and 170° F. for about 12 hours to about 336 hours to give a heat-treated distilled spirit mixture;
(b) removing an amount of heat-treated distilled spirit mixture from step (a);
(c) contacting the removed amount of heat-treated distilled spirit mixture with wood and actinic light at a wavelength spectrum ranging from 400 nm to 1000 nm for at least two hours to yield a heat-treated and actinic light-treated distilled spirit mixture;
(d) transferring the heat-treated and actinic light-treated distilled spirit mixture or a portion thereof to an amount of an unmatured distilled spirit to give a combined mixture of unmatured distilled spirit and heat-treated and actinic light-treated distilled spirit; and
(e) providing heat to the combined mixture of unmatured distilled spirit and heat-treated and actinic light-treated distilled spirit from step (d) or portion thereof to maintain a temperature of between about 140° F. and about 170° F. for about 12 hours to about 336 hours to produce the unmature spirit.

24. The process of claim 23, wherein the unmature distilled spirit is selected from the group consisting of sugar cane spirits, grain spirits, fruit spirits, and agave spirits.

25. The process of claim 23, wherein the temperature of step (a) and step (e) is maintained at between about 140° F. and about 150° F. for about 168 hours to about 226 hours.

26. The process of claim 23, wherein the process further comprises:
(f) contacting the mature spirit from step (e) with wood and actinic light at a wavelength spectrum ranging from 400 nm to 1000 nm for about 12 hours to about 96 hours.

27. The process of claim 26, wherein the process further comprises:
(g) heating with wood at a temperature of between about 140° F. and about 170° F. for about 24 hours to about 336 hours.

28. The process of claim 23, wherein step (c) is vented to maintain a pressure of about 10 psi.

29. A process for producing a mature spirit, the process comprising:
(a) contacting a mixture consisting essentially of a first unmatured distilled spirit with wood and actinic light at a wavelength spectrum ranging from 400 nm to 1000 nm for at least two hours to yield an actinic light-treated distilled spirit mixture;
(b) transferring the actinic light-treated distilled spirit mixture or a portion thereof to a second unmatured distilled spirit or a portion thereof to yield a combined mixture of heat-treated distilled spirit and unmatured distilled spirit; and
(c) providing heat to the combined mixture of heat-treated distilled spirit and second unmatured distilled spirit from step (b) or portion thereof to maintain a temperature of between about 140° F. and about 170° F. for about 12 hours to about 336 hours to produce the mature spirit.

30. The process of claim 29, wherein step (a) is vented to maintain a pressure of about 10 psi.

31. A process for producing a mature spirit, the process comprising:
(a) contacting a first mixture consisting essentially of an unmatured distilled spirit with wood and actinic light at a wavelength spectrum ranging from 400 nm to 1000 nm for at least two hours to yield an actinic light-treated distilled spirit mixture;
(b) providing heat to a second mixture consisting essentially of an unmatured distilled spirit and wood to maintain a temperature of between about 140° F. and about 170° F. for about 12 hours to about 336 hours to yield a heat-treated distilled spirit mixture;
(c) combining the actinic light-treated distilled spirit mixture or a portion thereof and the heat-treated distilled spirit mixture or a portion thereof to yield a combined mixture of an actinic light-treated distilled spirit and heat-treated distilled spirit; and
(d) providing heat to the actinic light-treated distilled spirit and heat-treated distilled spirits of step (c) or portion thereof to maintain a temperature of between about 140° F. and about 170° F. for about 12 hours to about 336 hours to yield a mature spirit.

32. The process of claim 31, wherein step (a) is vented to maintain a pressure of about 10 psi.

* * * * *